United States Patent
Deguchi

(10) Patent No.: US 9,606,910 B2
(45) Date of Patent: Mar. 28, 2017

(54) METHOD AND APPARATUS FOR DATA REDUCTION

(71) Applicant: Akira Deguchi, Santa Clara, CA (US)

(72) Inventor: Akira Deguchi, Santa Clara, CA (US)

(73) Assignee: Hitachi, Ltd., Tokyo (JP)

( * ) Notice: Subject to any disclaimer, the term of this patent is extended or adjusted under 35 U.S.C. 154(b) by 400 days.

(21) Appl. No.: 13/743,596

(22) Filed: Jan. 17, 2013

(65) Prior Publication Data

US 2014/0201489 A1    Jul. 17, 2014

(51) Int. Cl.
*G06F 12/00* (2006.01)
*G06F 12/02* (2006.01)
*G06F 3/06* (2006.01)

(52) U.S. Cl.
CPC ........ *G06F 12/0246* (2013.01); *G06F 3/0638* (2013.01); *G06F 3/0641* (2013.01); *G06F 3/0644* (2013.01); *G06F 3/0665* (2013.01)

(58) Field of Classification Search
CPC ............... G06F 3/0665; G06F 12/1072; G06F 13/1663; G06F 15/17331; G06F 3/0641
USPC .................................................. 711/170, 152
See application file for complete search history.

(56) References Cited

U.S. PATENT DOCUMENTS

| | | | | |
|---|---|---|---|---|
| 7,206,915 | B2 * | 4/2007 | DeSouter et al. | 711/203 |
| 7,870,105 | B2 | 1/2011 | Arakawa et al. | |
| 2006/0282641 | A1 * | 12/2006 | Fujimoto et al. | 711/173 |
| 2007/0005928 | A1 * | 1/2007 | Trika et al. | 711/202 |
| 2007/0245114 | A1 * | 10/2007 | Kakui et al. | 711/170 |
| 2008/0104346 | A1 * | 5/2008 | Watanabe et al. | 711/162 |
| 2008/0104347 | A1 * | 5/2008 | Iwamura et al. | 711/162 |
| 2011/0060885 | A1 * | 3/2011 | Satoyama et al. | 711/170 |
| 2011/0125720 | A1 * | 5/2011 | Jayaraman | G06F 17/30156 707/692 |
| 2011/0231613 | A1 | 9/2011 | Ober et al. | |
| 2011/0238634 | A1 | 9/2011 | Kobara | |
| 2012/0151177 | A1 * | 6/2012 | Kalach | G06F 3/0608 711/203 |
| 2012/0260021 | A1 * | 10/2012 | Rudelic | G06F 3/0641 711/103 |

FOREIGN PATENT DOCUMENTS

JP    2011-203842 A    10/2011

OTHER PUBLICATIONS

Japanese Office Action received in corresponding Japanese Application No. 2013-175528 dated Nov. 1, 2016.

* cited by examiner

*Primary Examiner* — Mark Giardino, Jr.
*Assistant Examiner* — Tasnima Matin
(74) *Attorney, Agent, or Firm* — Mattingly & Malur, PC

(57) ABSTRACT

Embodiments of the invention provide data reduction in storage systems. In one embodiment, a computer comprises: a memory; and a controller operable to manage information, which corresponds to a plurality of addresses, of one or more volumes provided from a storage system to the computer and including at least one set of multiple storage areas sharing same data to be stored in the storage system. The controller is operable to manage storing of the shared same data in the memory of the computer by using the information of the storage areas.

23 Claims, 26 Drawing Sheets

| Pool address | Flash Memory address |
|---|---|
| 11-0 | 0 |
| 11-512 | 2048 |
| 10-512 | 2560 |
| 10-0 | 3072 |
| ... | ... |

| VVOL ID | VVOL address | Hash value |
|---|---|---|
| 00 | 0 | aaa |
| 00 | 512 | bbb |
| 00 | 1024 | ccc |
| 00 | 1536 | ddd |
| ... | ... | ... |
| 01 | 0 | eee |
| 01 | 512 | bbb |
| 01 | 1024 | aaa |
| 01 | 1536 | ggg |
| ... | ... | ... |

Fig.8

| Hash value | Pool address |
|---|---|
| aaa | 10-0 |
| bbb | 11-0 |
| ccc | 11-512 |
| ddd | 10-512 |
| Eee | 10-1024 |
| ... | ... |

Fig.9

| VVOL ID | VVOL address | Pool address |
|---|---|---|
| 0 | 0 | — |
| 0 | 512 | 11-0 |
| 0 | 1024 | 11-512 |
| 0 | 1536 | 10-512 |
| ... | ... | ... |
| 1 | 0 | — |
| 1 | 512 | 11-0 |
| 1 | 1024 | 10-0 |
| ... | ... | ... |

Fig.10

| Pool address | Flash Memory address |
|---|---|
| 11-0 | 0 |
| 11-512 | 2048 |
| 10-512 | 2560 |
| 10-0 | 3072 |
| ... | ... |

Fig.11

| Pool address | Flash Memory address |
|---|---|
| 11-0 | 0 |
| 11-512 | 2048 |
| 10-512 | 2560 |
| 10-0 | 3072 |
| 00-512 (VVOL address) | 1024 |
| 00-1536 (VVOL address) | 3584 |
| ... | ... |

Fig.17

| VVOL ID | VVOL address | Pool address | Write Back |
|---|---|---|---|
| 00 | 0 | — | |
| 00 | 512 | 11-0 | ON |
| 00 | 1024 | 11-512 | |
| 00 | 1536 | 10-512 | ON |
| ... | ... | ... | |
| 01 | 0 | — | |
| 01 | 512 | 11-0 | |
| 01 | 1024 | 10-0 | |
| ... | ... | ... | |

Fig.18

METHOD AND APPARATUS FOR DATA REDUCTION

BACKGROUND OF THE INVENTION

The present invention relates generally to storage systems and, more particularly, to data reduction in storage systems.

US2011/0231613 describes remote storage caching technology to use the SSD (Solid State Drive) installed on the server as cache for the data stored in the storage system connected to the server. U.S. Pat. No. 7,870,105 describes de-duplication technology to reduce the amount of data in the storage system. With this data reduction technology, the storage system provides virtual storage area (Virtual Volume, VVOL for short) to the server. The address of the physical storage area corresponding to the partial area of the volume is managed. If the data of two or more partial areas of the volume are the same, the addresses of those partial areas point to one physical area. Thus, the capacity of physical area is reduced. This technology is called de-duplication. Two or more partial areas of difference volume can share the same physical area.

In general, a storage system is shared by multiple servers. By performing the deduplication in the storage system, the data stored in multiple servers are also de-duplicated. Consequently, efficiency is improved. In addition to the de-duplication functionality, the snapshot functionality also shares one physical area.

When the storage system has data reduction functionalities, such as de-duplication or snapshot, the server cannot perceive the data sharing status in the storage system. As such, if the server reads two different partial areas which point to the same physical area, the same data is transferred twice to the server. Moreover, from the view point of the server, since the transferred data are data of different addresses, two identical data are stored in flash memory in the server. The utilization of network and flash memory in the server will be decreased.

When the server has data reduction functionalities, the same data stored in two or more servers are not reduced. For example, OS data will not be reduced, although most of the data are the same. The configuration in which both of the storage system and the server have data reduction functionalities could be considered. However, the data reduction processing overhead will be 2 times. As such, the amount of data transfer between the storage system and the server will not be reduced.

BRIEF SUMMARY OF THE INVENTION

Exemplary embodiments of the invention provide data reduction in storage systems to achieve improvement in utilization efficiency of the storage space and network. A first embodiment is directed to a method to store directly the data which is reduced in the storage system into the flash memory of the server. In particular, the write through mode of write processing is described. With through mode, write data is written in the storage system in synchronous with write processing of the operating system. In a second embodiment, write back mode of write processing is described. With back mode, write data is written in the storage system asynchronously with respect to write processing of the operating system. In a third embodiment, the method to apply these technologies to multiple server configurations or external storage configuration is described.

In accordance with an aspect of the present invention, a computer comprises: a memory; and a controller operable to manage information, which corresponds to a plurality of addresses, of one or more volumes provided from a storage system to the computer and including at least one set of multiple storage areas sharing same data to be stored in the storage system. The controller is operable to manage storing of the shared same data in the memory of the computer by using the information of the storage areas.

In some embodiments, the information of the storage areas comprises information relating to virtual volume IDs (identifiers) and addresses of the volumes, pool addresses in a pool of physical storage areas in the storage system which correspond to the virtual volume IDs and addresses, and memory addresses in the memory of the computer which correspond to the pool addresses indicating storing of data of the pool addresses in the memory. The controller is operable to receive information of the pool address from the storage system, use the information of any pool address of the pool addresses to determine whether data of the pool address is already stored in the memory of the computer, and if the data of the pool address is not already stored in the memory, then allocate an area in the memory to store the data of the pool address. The controller is operable to update the information as a result of any of an update of the virtual volume IDs and addresses, an update of the pool addresses which correspond to the virtual volume IDs and addresses, or an update of the memory addresses which correspond to the pool addresses.

In specific embodiments, the controller is operable, for reading data from a read target region of the storage system if the data in the read target region is not already stored in the memory of the computer, to: receive data from the storage system and a pool address in a pool of physical storage areas in the storage system which corresponds to a virtual volume ID (identifier) and address of the target region; allocate an area in the memory and store the received data in the allocated area in the memory; and update the information to reflect any changes to correspondence between the virtual volume ID and address and the pool address, and any changes to correspondence between a memory address of the allocated area in the memory and the pool address.

In some embodiments, the controller is operable, for writing write data to a write destination region of the storage system, to: receive a completion message of writing the write data to the write destination region of the storage system and a pool address in a pool of physical storage areas in the storage system which corresponds to a virtual volume ID (identifier) and address of the write destination region; determine whether the received pool address corresponding to the virtual volume ID and address of the write destination region is registered in a pool address table and whether the received pool address corresponding to the virtual volume ID and address of the write destination region has changed in the pool address table, the pool address table showing correspondence between pool address and virtual volume ID and address; if the received pool address is registered in the pool address table and if the received pool address corresponding to the virtual volume ID and address of the write destination region has not changed in the pool address table, then determine whether the memory has an area allocated for the received pool address and, if yes, then store the write data in the memory and, if no, then allocate an area in the memory, update information on correspondence between the received pool address and a memory address of the allocated area in the memory, and store the write data to the allocated area in the memory; and if the received pool address is not registered in the pool address table or if the received pool address corresponding to the virtual volume ID and address of the write destination region has changed in the pool address table, then update the pool address table to register the received pool address corresponding to the virtual volume ID and address of the write destination region, allocate an area in the memory, update information on correspondence between the received pool address and a memory address of the allocated area in the memory, and store the write data to the allocated area in the memory.

In specific embodiments, the controller is operable, for releasing an area in the memory corresponding to a virtual volume ID (identifier) and address, to: delete a record of the virtual volume ID and address and a corresponding pool address in a pool address table showing correspondence between pool address and virtual volume ID and address; and if the pool address has a corresponding memory address indicating storing of data of the pool address in an area of the memory at the memory address and if there is no other virtual volume ID and address corresponding to the pool address, then release the area of the memory at the memory address and update information on correspondence between the pool address and the memory address to reflect release of the area at the memory address.

In some embodiments, the controller is operable, for writing, in write back mode, write data to a write destination region having a write target address which is a virtual volume ID (identifier) and address in the storage system, to: if a write back value of the write target address to write data in the storage system is ON indicating the write data is cached in an allocated area in the memory but has not yet been written to the storage system, writing the write data in the allocated area in the memory of the computer; if the write back value of the write target address to write data in the storage system is not ON, and if there is no memory address in the memory corresponding to a pool address which corresponds to the write target address or if the pool address corresponds to multiple virtual volume addresses in the storage system, then allocate an area in the memory, update information on correspondence between the pool address and the write target address, update information on correspondence between the valid pool address and a memory address of the allocated area in the memory, and store the write data to the allocated area in the memory; if the write back value of the write target address to write data in the storage system is not ON, and if there is a memory address in the memory corresponding to a pool address which corresponds to the write target address, and if the pool address does not correspond to multiple virtual volume addresses in the storage system, then store the write data to the allocated area in the memory; and write the write data in the memory to the write target address in the storage system asynchronously.

In specific embodiments, the computer is a first computer that shares a virtual volume of the storage system with a second computer and stores data in the shared virtual volume to a memory address in the memory of the first computer which is a first memory, the data also to be stored in a second memory of the second computer. If the data in the shared virtual volume is updated in the memory of the second computer, the second computer sends an invalidation message to the first computer, and the controller of the first computer is operable to delete the data from the memory address in the first memory and delete correspondence between the memory address and a virtual volume ID (identifier) and address of the shared virtual volume.

Another aspect of the invention is directed to a storage system in a system which includes the storage system and a computer that stores in a memory data to be stored in the storage system, including data which is same data shared by multiple storage areas in the storage system. The storage system comprises: a storage device to provide one or more volumes to a computer for storing data, the one or more volumes including at least one set of multiple storage areas sharing same data to be stored in the storage device; and a storage controller operable to receive an I/O (Input/Output) command from the computer specifying a virtual volume ID (identifier) and address of a volume in the storage device, calculate a pool address in a pool of physical storage areas in the storage device which corresponds to the virtual volume ID and address, and send the pool address corresponding to the virtual volume ID and address to the computer.

In some embodiments, the I/O command is a write command to write data to a write destination region having the specified virtual volume ID and address. The storage controller is operable to: if no pool area is allocated to the specified virtual volume ID and address or if the calculated pool address is shared by multiple storage areas, calculate a hash value for the write data, determine if there is any same data stored in the storage system having the hash value, update the pool address of the write data to a pool address of the same data having the hash value if the same data having the hash value is already stored in the storage system, allocate an area in the pool having an allocated pool address in the pool and update the pool address of the write data to the allocated pool address if there is no same data stored in the storage system, and send to the computer the updated pool address corresponding to the specified virtual volume ID and address; and if a pool area is allocated to the specified virtual volume ID and address and if the calculated pool address is not shared by multiple virtual volume addresses, store the write data to the calculated pool address, and send to the computer the calculated pool address corresponding to the specified virtual volume ID and address.

In specific embodiments, the storage controller is operable, upon receiving an area release command for releasing an area in the memory corresponding to a virtual volume ID and address in the storage device, to: calculate a pool address corresponding to the virtual volume ID and address corresponding to the area in the memory to be released; if the calculated pool address corresponds to multiple virtual volume addresses, then delete correspondence between a hash value of data in the virtual volume ID and address and the virtual volume ID and address which corresponds to the area in the memory to be released; and if the calculated pool address does not correspond to multiple virtual volume addresses, then release a pool area corresponding to the calculated pool address, delete correspondence between a hash value of data in the calculated pool address and the calculated pool address, and delete correspondence between a hash value of data in the virtual volume ID and address and the virtual volume ID and address which corresponds to the area in the memory to be released.

In some embodiments, the I/O command is a read command to read data from a read target region having the specified virtual volume ID and address, and wherein the storage controller is operable, upon receiving from the computer a pool address obtainment command for obtaining a pool address corresponding to the specified virtual volume ID and address in the storage device prior to reading the data, to: calculate a pool address of the specified virtual volume ID and address of the pool address obtainment command based on correspondence between the specified virtual volume ID and address and a hash value of data in the specified virtual volume ID and address and correspondence between the hash value and the pool address; and send the calculated pool address to the computer.

In accordance with another aspect of this invention, a system comprises: a storage system having a storage device to provide one or more volumes for storing data, and a storage controller; and a computer having a memory, and a controller operable to manage information, which corresponds to a plurality of addresses, of the one or more volumes provided from the storage system to the computer and including at least one set of multiple storage areas sharing same data to be stored in the storage system. The controller is operable to manage storing of the shared same data in the memory of the computer by using the information of the storage areas.

These and other features and advantages of the present invention will become apparent to those of ordinary skill in the art in view of the following detailed description of the specific embodiments.

BRIEF DESCRIPTION OF THE DRAWINGS

FIG. 8 is an example of the VVOL hash table managed in the storage system.

FIG. 9 is an example of the data address table managed in the storage system.

FIG. 10 is an example of the pool address table in the server in accordance with the first embodiment.

FIG. 11 is an example of the server cache directory in the server in accordance with the first embodiment.

FIG. 17 is an example of the server cache directory in accordance with the second embodiment.

FIG. 18 is an example of the pool address table in accordance with the second embodiment.

DETAILED DESCRIPTION OF THE INVENTION

Figure 1:
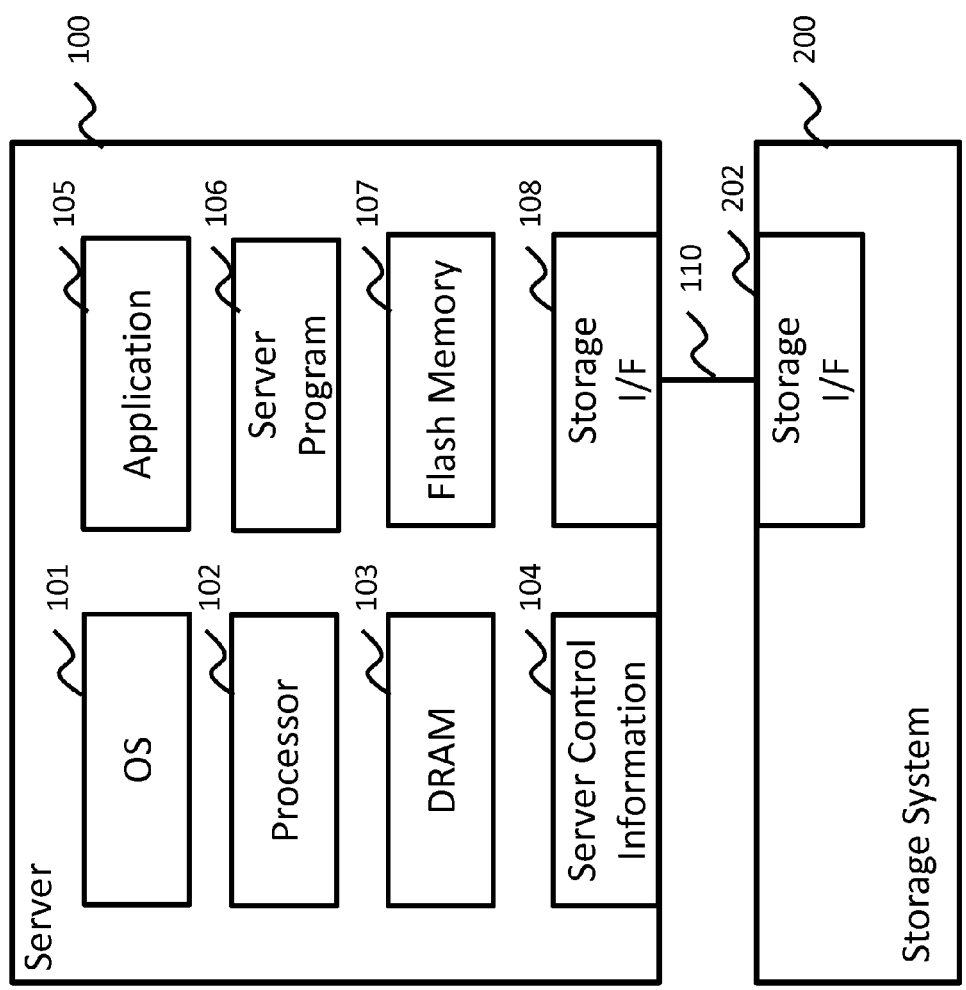
FIG. 1 is a diagram showing a computer system focusing on the server in accordance with a first embodiment of the invention.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium including non-transient medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for data reduction in storage systems.

First Embodiment

FIG. 1 is a diagram showing a computer system focusing on the server in accordance with a first embodiment of the invention. The computer system comprises server 100 and storage system 200. The server 100 has OS (Operating System) 101, processor 102, DRAM 103, server control information 104, application 105, server program 106, flash memory 107, and storage I/F 108. The server 100 provides service by executing an OS and application such as a database system. The data processed by the database system is stored in the storage system 200. The data may be cached in flash memory of the server 100. The server 100 is coupled to the storage system 200 via a network 110.

Figure 2:
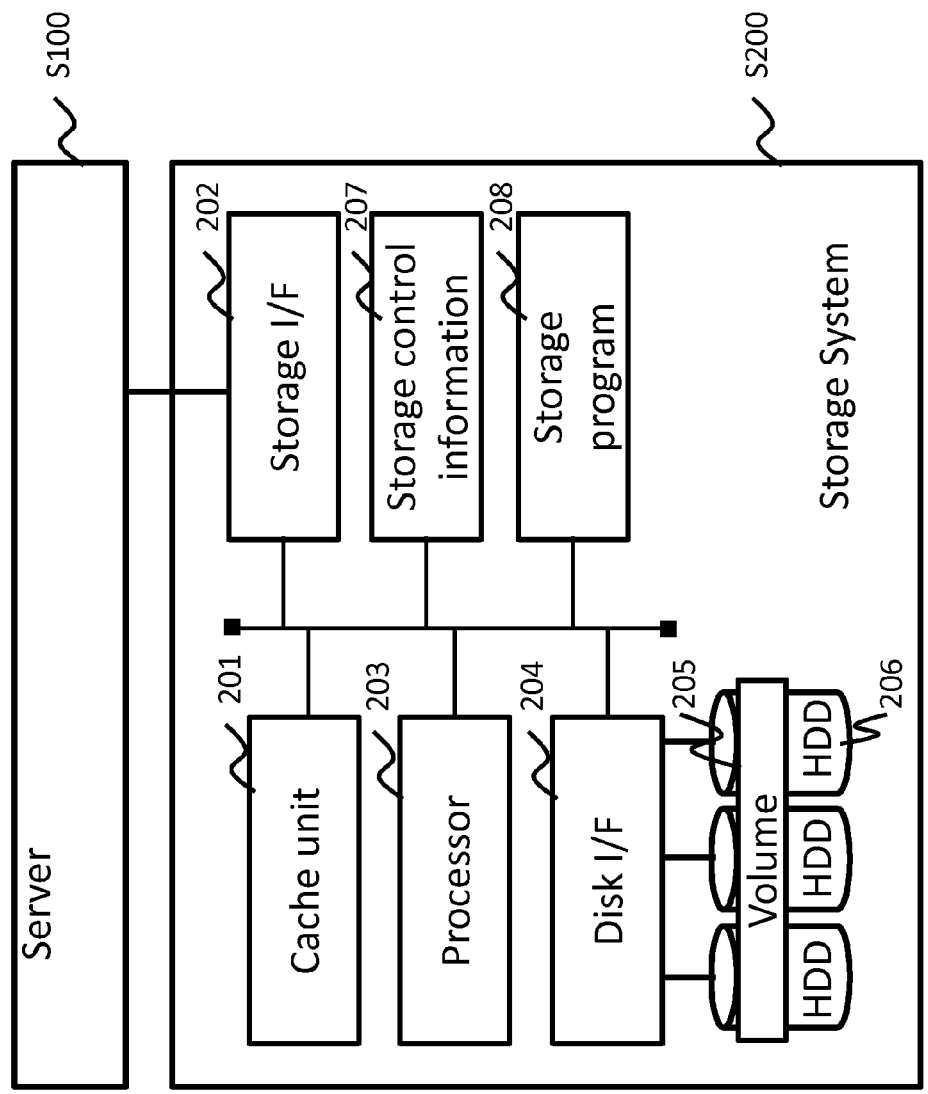
FIG. 2 is a diagram showing a computer system focusing on the storage system in accordance with the first embodiment.

FIG. 2 is a diagram showing a computer system focusing on the storage system in accordance with the first embodiment. The storage system 200 comprises cache unit 201, storage I/F 202, processor 203, disk I/F 204, volume 205, HDD 206, storage control information 207, and storage program 208. The storage I/F 202 is coupled to the server 100 via a network 110, and mediates a communication with the server 100. The processor 203 executes a wide variety of processing by executing a wide variety of programs that have been stored into storage program 208. Moreover, the processor 203 executes a wide variety of processing by using a wide variety of information that has been stored into storage control information 207. The disk I/F 204 is coupled to at least one HDD 206 as an example of a physical storage device via a bus. The volume 205 that is configured to manage data is configured by at least one storage region of the HDD 206 for instance. The physical storage device is not restricted to an HDD 206 and can also be an SSD (Solid State Drive) or a DVD, for instance. At least one HDD 206 can be collected up in a unit of a parity group, and a high reliability technique such as a RAID (Redundant Arrays of Independent Disks) can also be used. The storage control information 207 stores a wide variety of information used by a wide variety of programs. The storage program 208 stores a wide variety of programs, such as read processing program or write processing program and so on. The cache unit 201 caches the data stored in HDD 206 for performance boost.

Figure 3:
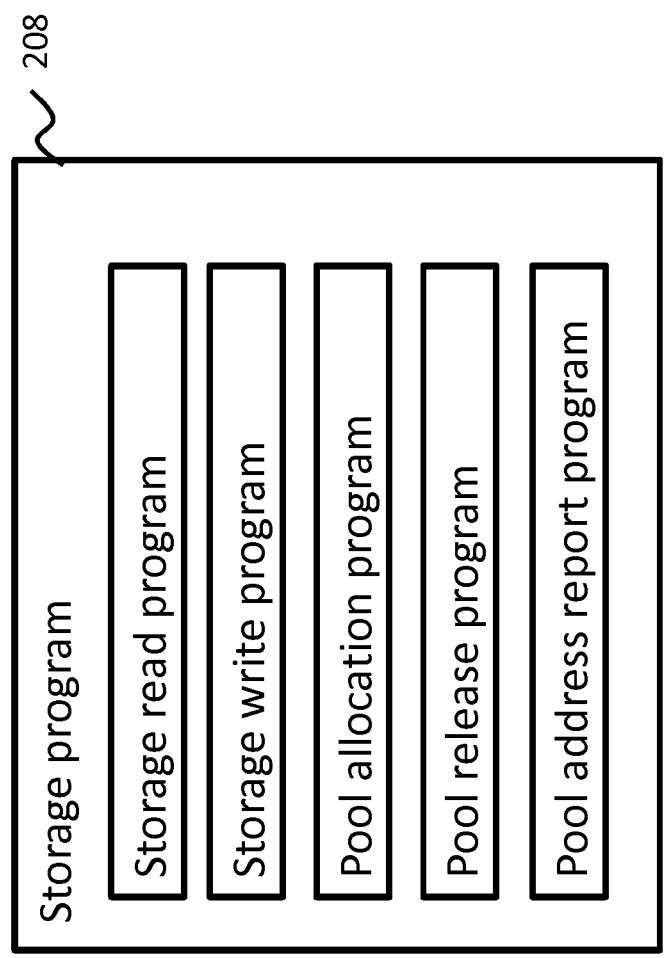
FIG. 3 is a detailed block diagram showing an example of the storage program in accordance with the first embodiment.

FIG. 3 is a detailed block diagram showing an example of the storage program 208 in accordance with the first embodiment. The storage program 208 contains a storage read program, a storage write program, a pool allocation program, a pool release program and a pool address report program. These programs are described later.

Figure 4:
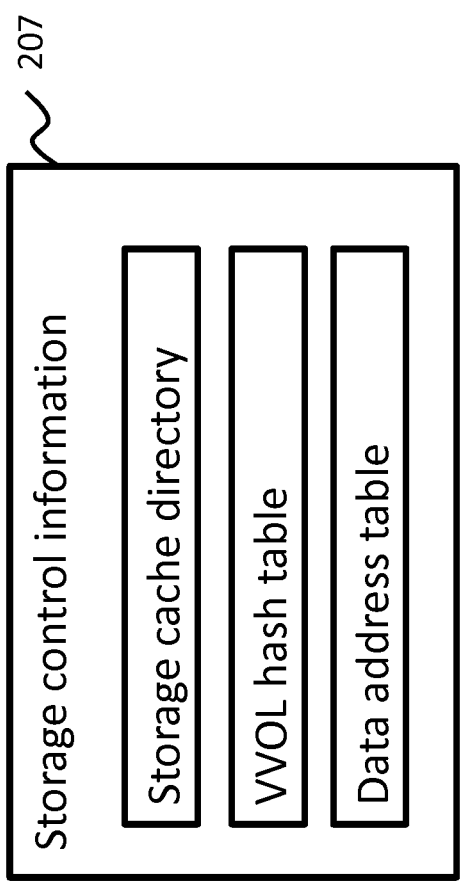
FIG. 4 is a detailed block diagram showing an example of the storage control information in accordance with the first embodiment.

FIG. 4 is a detailed block diagram showing an example of the storage control information 207 in accordance with the first embodiment. The storage control information 207 contains storage cache directory, VVOL hash table, and data address table. These pieces of control information are used by programs in the storage program 208. The storage cache directory manages whether the data of HDD 206 is cached into the cache unit 201. If the data is cached, the address on the cache unit 201 is also managed by the storage cache directory. The VVOL hash table manages the hash value of the data specified VVOL address. Details of the VVOL hash table are shown in FIG. 8. The data address table manages the physical address of the data corresponding to the hash value. Details of the data address table are shown in FIG. 9.

Figure 5:
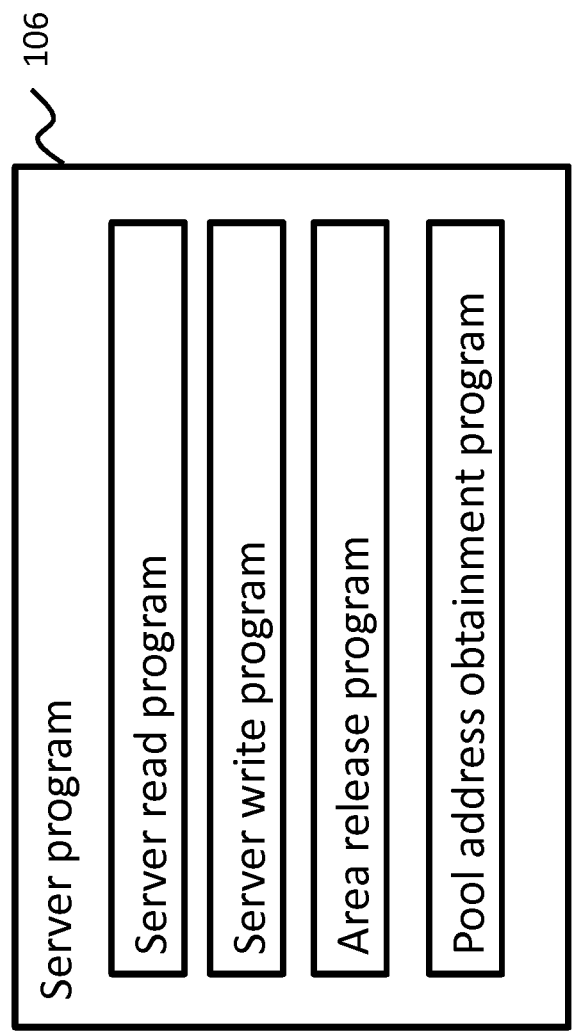
FIG. 5 is a detailed block diagram showing an example of the server program in accordance with the first embodiment.

FIG. 5 is a detailed block diagram showing an example of the server program 106 in accordance with the first embodiment. The server program 106 includes a server read program, a server write program, an area release program, and a pool address obtainment program. These programs are described later.

Figure 6:
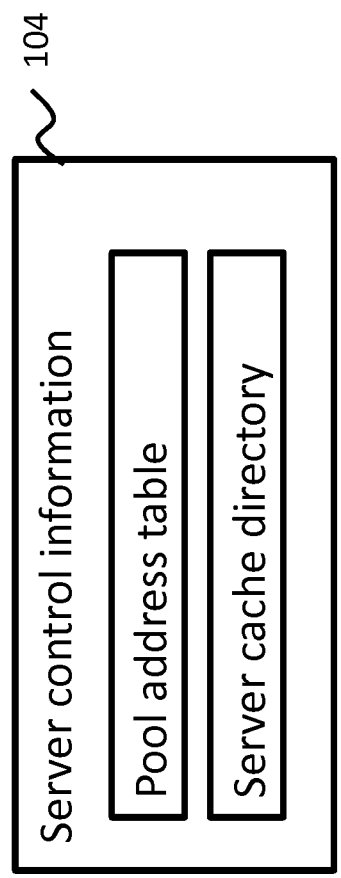
FIG. 6 is a detailed block diagram showing an example of the server control information in accordance with the first embodiment.

FIG. 6 is a detailed block diagram showing an example of the server control information 104 in accordance with the first embodiment. The server control information 104 includes pool address table and server cache directory. The pool address table manages correspondence relation between VVOL address and pool address. The server cache directory manages whether the data of the storage system 200 is cached into the flash memory 107 of the server 100. If the data is cached, the address on the flash memory 107 is also managed by the server cache directory.

Figure 7:
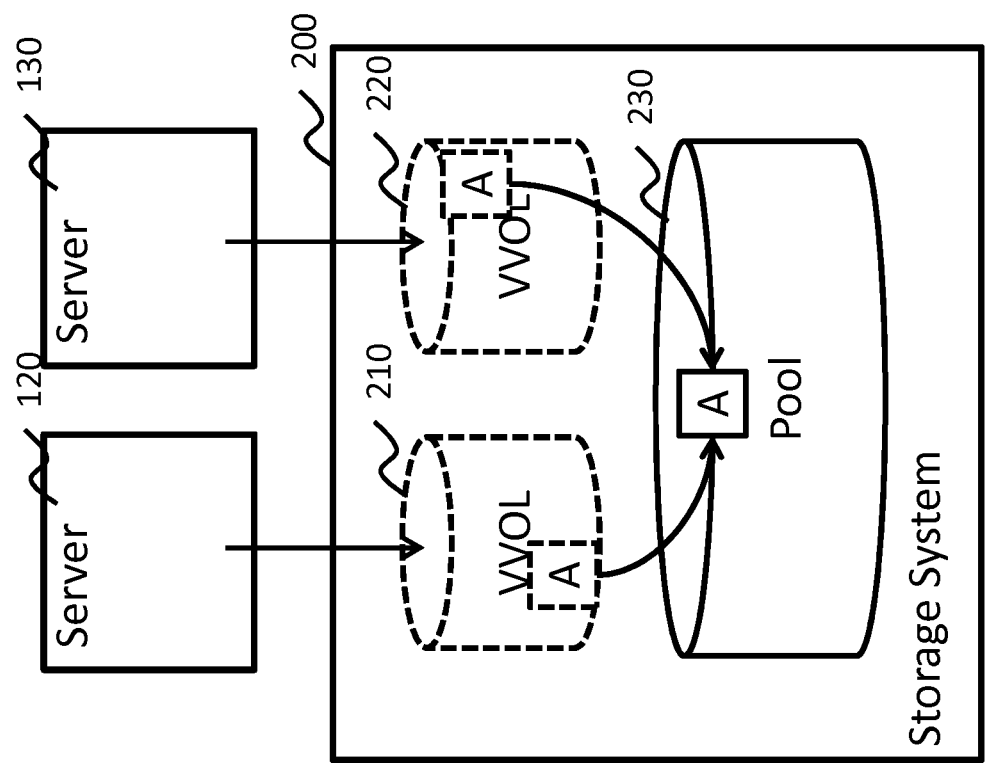
FIG. 7 is a conceptual diagram illustrating an example of data reduction in the storage system in accordance with the first embodiment.

FIG. 7 is a conceptual diagram illustrating an example of data reduction in the storage system 200 in accordance with the first embodiment. This example involves a server 120, another server 130, and the storage system 200. The storage system 200 has a VVOL 210 provided to the server 120, a VVOL 220 provided to the server 130, and a pool 230. The VVOL 120 and VVOL 130 are virtual volumes without physical storage area. The pool 230 corresponds to the physical storage area. The pool 230 could include volumes with physical storage area. When the storage system 200 receives the write command to VVOL, a pool area is allocated and the correspondence relation between write destination area of VVOL and the allocated pool area is managed by the VVOL hash table and the data address table of the storage control information 207 of FIG. 4. The details of these two tables are shown in FIGS. 8 and 9. As an example of FIG. 7, when the same data is written in two VVOL areas, only one data is stored in the pool 230. As a result, useless pool consumption is avoided. The various processing steps of the detection of the same data, etc. are explained in FIG. 13.

FIG. 8 is an example of the VVOL hash table managed in the storage system 200. The VVOL hash table has columns of VVOL ID, VVOL address, and hash value. The VVOL ID is an identification to identify the volume uniquely in the storage system. The VVOL address is an address to point to the partial area within the volume which is specified by the VVOL ID. The hash value is a value calculated from the data stored in the address specified by the VVOL ID and VVOL address.

FIG. 9 is an example of the data address table managed in the storage system 200. The data address table has columns of hash value and pool address. The hash value is a value corresponding to the hash value in the VVOL hash table of FIG. 8. The pool address manages addresses of the pool 230. The data corresponding to the specified hash value is stored in the address. For example, pool address "11-512" means pool volume ID is 11 and the address in the pool volume is 512. Other methods to generate the pool address could also be used. In the example of FIG. 8 and FIG. 9, the hash value of the data stored in address 0 of VVOL 0 and address 1024 of VVOL 01 is "aaa." The data corresponding to the hash value "aaa" is stored in address 10-0 of pool. To deal with the collision of a hash value, this table can store two or more pool addresses for one hash value. To classify the two or more pool addresses for one hash value, VVOL ID and VVOL address are also managed with a pool address.

Figure 12:
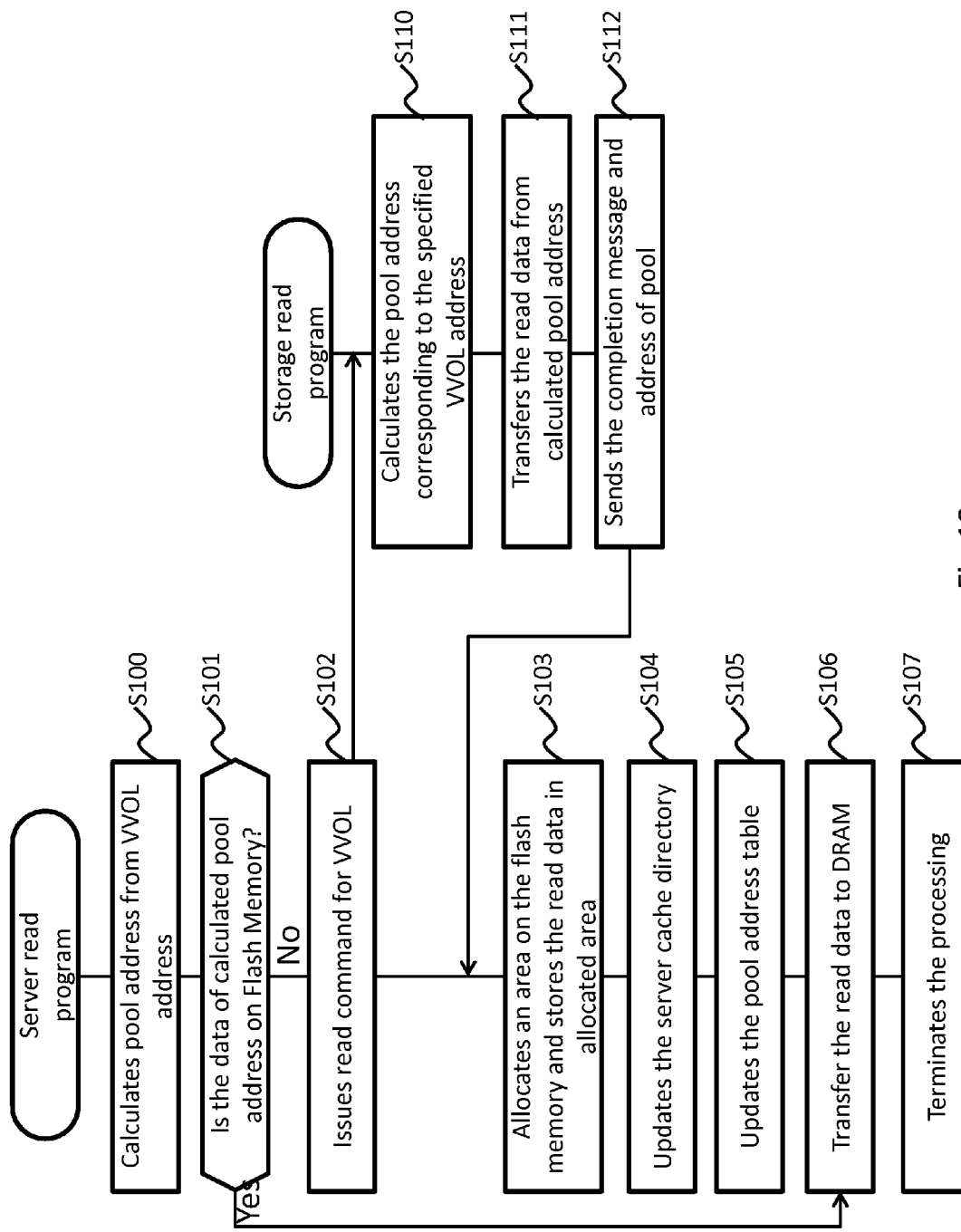
FIG. 12 is a flow diagram illustrating an example of a read processing.
Figure 13:
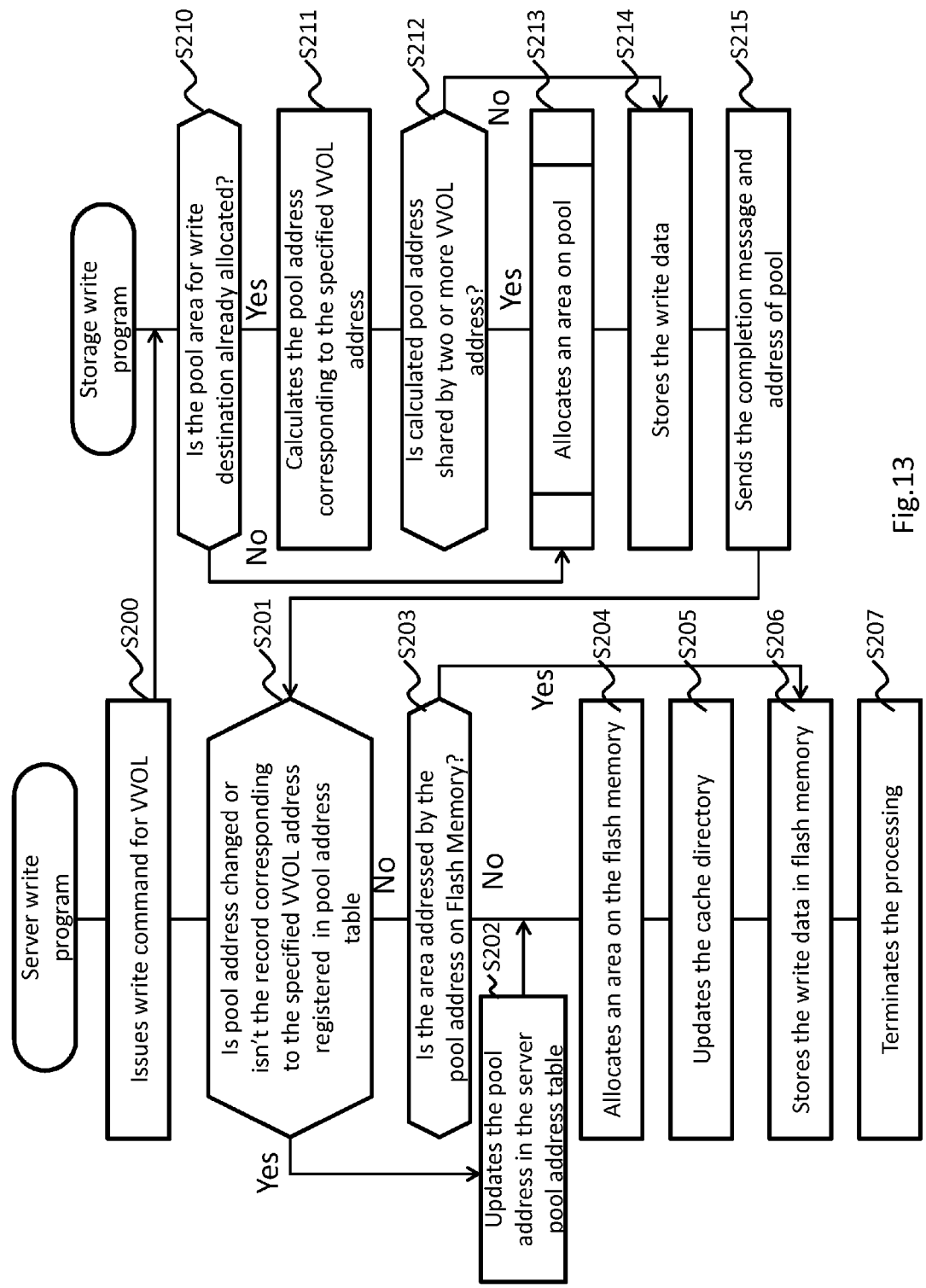
FIG. 13 is a flow diagram illustrating an example of a write processing.
Figure 16:
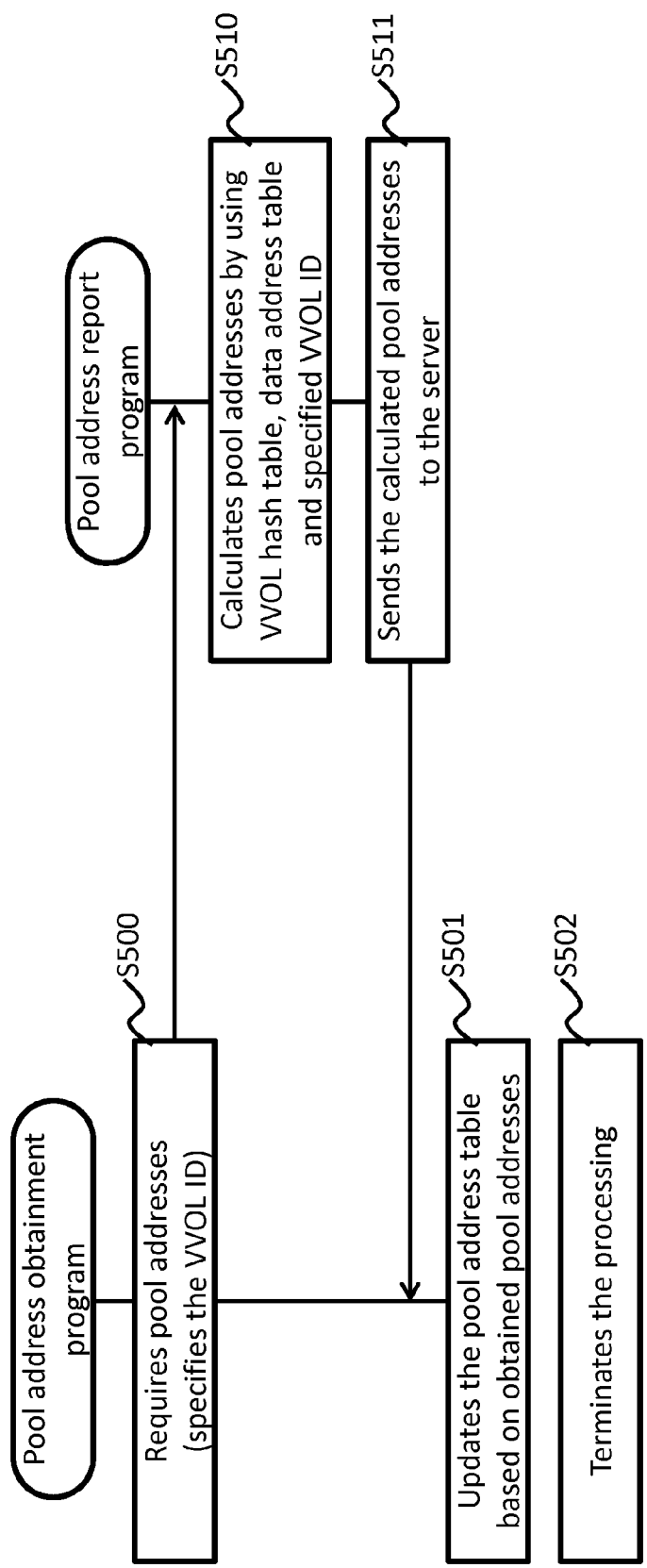
FIG. 16 is a flow diagram illustrating an example of a processing to obtain the pool addresses.

FIG. 10 is an example of the pool address table in the server 100 in accordance with the first embodiment. The pool address table has columns of VVOL ID, VVOL address, and pool address. The meanings of the VVOL ID and VVOL address are the same as those of the VVOL ID and VVOL address in FIG. 8. The meaning of the pool address is the same as that of the pool address in FIG. 9. In the example of FIG. 10, the data of VVOL 0 and address 512 is actually stored in pool address 11-0. The pool address entry "-" means that the server does not have the information about pool address corresponding to VVOL 0 and VVOL address 0. The value of pool address is stored in the pool address table by the timing of the I/O to the VVOL 0 and address 0 or obtaining processing of the pool address. I/O processing is shown in FIG. 12 and FIG. 13. Pool address obtainment processing is shown in FIG. 16.

FIG. 11 is an example of the server cache directory in the server 100 in accordance with the first embodiment. The server cache directory has columns of pool address and flash memory address. The meaning of the pool address is the same as that of the pool address in FIG. 10. The flash memory address manages addresses of the flash memory 107. The data corresponding to the specified pool address is stored in the address. For example, the data stored in pool address "11-0" in the storage system is cached into flash memory address 0 in the server 100. Although this example is described by table structure, other data structures, such as a tree structure, could also be used.

FIG. 12 is a flow diagram illustrating an example of a read processing. The server read program is executed in the server 100 and the storage read program is executed in the storage system 200. The server read program calculates pool address from VVOL address which is an access destination address by using pool address table in the server 100 (S100). Then, the server read program confirms whether the data of calculated pool address is on the flash memory (S101). If the data is on the flash memory, the server read program transfer the data to DRAM (S106) and terminates the processing (S107). If the data is not on the flash memory, the server read program issues the read command for VVOL to the storage system 200.

The storage system 200 which receives the read command executes the storage read program. The storage read program calculates the pool address corresponding to the specified VVOL address by using the VVOL hash table and data address table (S110). Then the storage read program transfers the read data from the calculated pool address (S111). Finally, the storage read program sends the completion message and the address of the pool area (S112). The server read program which receives the completion message allocates an area on the flash memory and stores the read data in the allocated area (S103). Then, the server read program updates the server cache directory (S104) and the pool address table (S105). The VVOL ID and VVOL address as an access destination and the pool address received from the storage system 200 are inserted or updated to the pool address table. The pool address and flash memory address allocated in step S103 are inserted or updated to the server cache directory. Finally, the server read program transfers the read data to DRAM and terminates the processing (S106 and S107).

In step S110, one or more pool addresses might be managed for one hash value described in FIG. 9. In this case, VVOL ID and VVOL address are managed with the pool address. Thus, the program selects pool address which is paired with VVOL ID and VVOL address as an access destination.

FIG. 13 is a flow diagram illustrating an example of a write processing. The server write program is executed in the server 100 and the storage write program is executed in the storage system 200. The server write program issues the write command for VVOL to the storage system 200 (S200). This example shows a write through mode of a write processing. The server write program issues the write command to the storage system in the timing according to the write through mode. The storage system 200 which receives the write command confirms whether the pool area corresponding to the write destination of VVOL is already allocated (S210). If the area is not allocated, the program progresses to step S213 for allocating area. If the area is already allocated, the program calculates the pool address corresponding to the access destination address of the VVOL (S211). Then, the program confirms whether the calculated pool address is shared by two or more VVOL addresses (S212). It could be realized by searching a record with the same hash value as the hash value of the access destination area. If the pool is shared, the program progresses to step S213 to allocate a new pool area. The data of other VVOL areas sharing the pool area can be protected by allocating the new pool area for the write data. If the pool is not shared, the program progresses to step S214 and stores the write data to the calculated address. A detailed processing of the pool area allocation is described in FIG. 14. Finally, the storage write program sends the completion message and the address of the pool area.

The server write program which receives the completion message confirms whether the pool address is changed or the pool address information corresponding to the write destination VVOL address is not registered in pool address table (S201). Since the pool area is allocated in the storage system 200 when the pool address is changed or the pool address is not registered in the table, the server write program updates the pool address table to register the new pool address (S202). In this case, the flash memory area is not allocated for the new pool address. Thus, the program progresses to step S204 to allocate a new flash memory and to store the write data. If the result of step S201 is "no," the program confirms whether there is an area addressed by the pool address returned from the storage system 200 (S203). Since the pool address is not changed and flash memory area is already allocated when there is an area in the flash memory, the program stores the write data in the pool address (step S206). If the pool address is not allocated, the program allocates an area on the flash memory (S204) and updates the cache directory (S205). Then, the program stores the write data in the allocated area (S206). Updating the cache directory means updating new flash memory address or inserting a record with new pool address and flash memory address. Finally, the server write program terminates the processing (S207).

Figure 14:
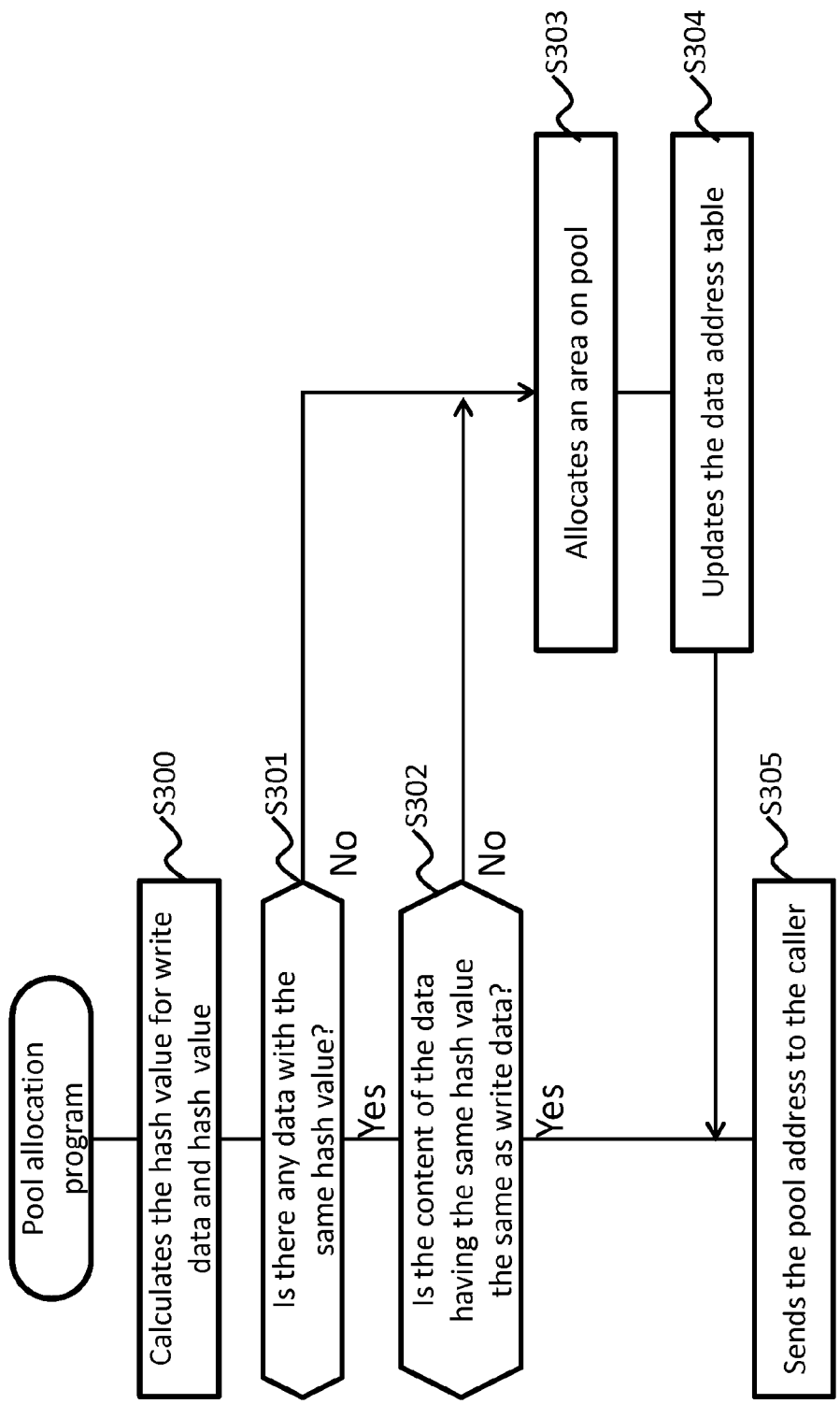
FIG. 14 is a flow diagram illustrating an example of the process of the pool allocation program called from step S213 of the storage write program in FIG. 13.

FIG. 14 is a flow diagram illustrating an example of the process of the pool allocation program called from step S213 of the storage write program in FIG. 13. The pool allocation program calculates the hash value for write data and stores it to the VVOL hash table (S300). Then, the program confirms whether there is a record with the same hash value calculated in the previous step (S301). This step is realized by searching the data address table using the calculated hash value. If the result of step S300 is "yes," the program confirms whether the content of the data having the same hash value is the same as the content of the write data (S302). If the result of step S302 is "yes," the program sends the pool address to the caller and terminates the processing (S305). By this processing, one pool area is shared by two or more areas of the VVOLs. If the result of step S301 or step S302 is "no," the program allocates an area on pool (S303) and updates the pool address of the write data to the pool address of the allocated area (S304). If there is no record with the hash value calculated in step S300, record with the hash value and the pool address is inserted to the data address table. Finally, the pool allocation program sends the pool address to the caller (S305). If there is no free area on the pool in step S303, the pool allocation program returns an error message to the caller. The write program which receives the error sends the error to the server. The message which promotes pool extension could be reported and displayed on the server 100 or a management server.

Figure 15:
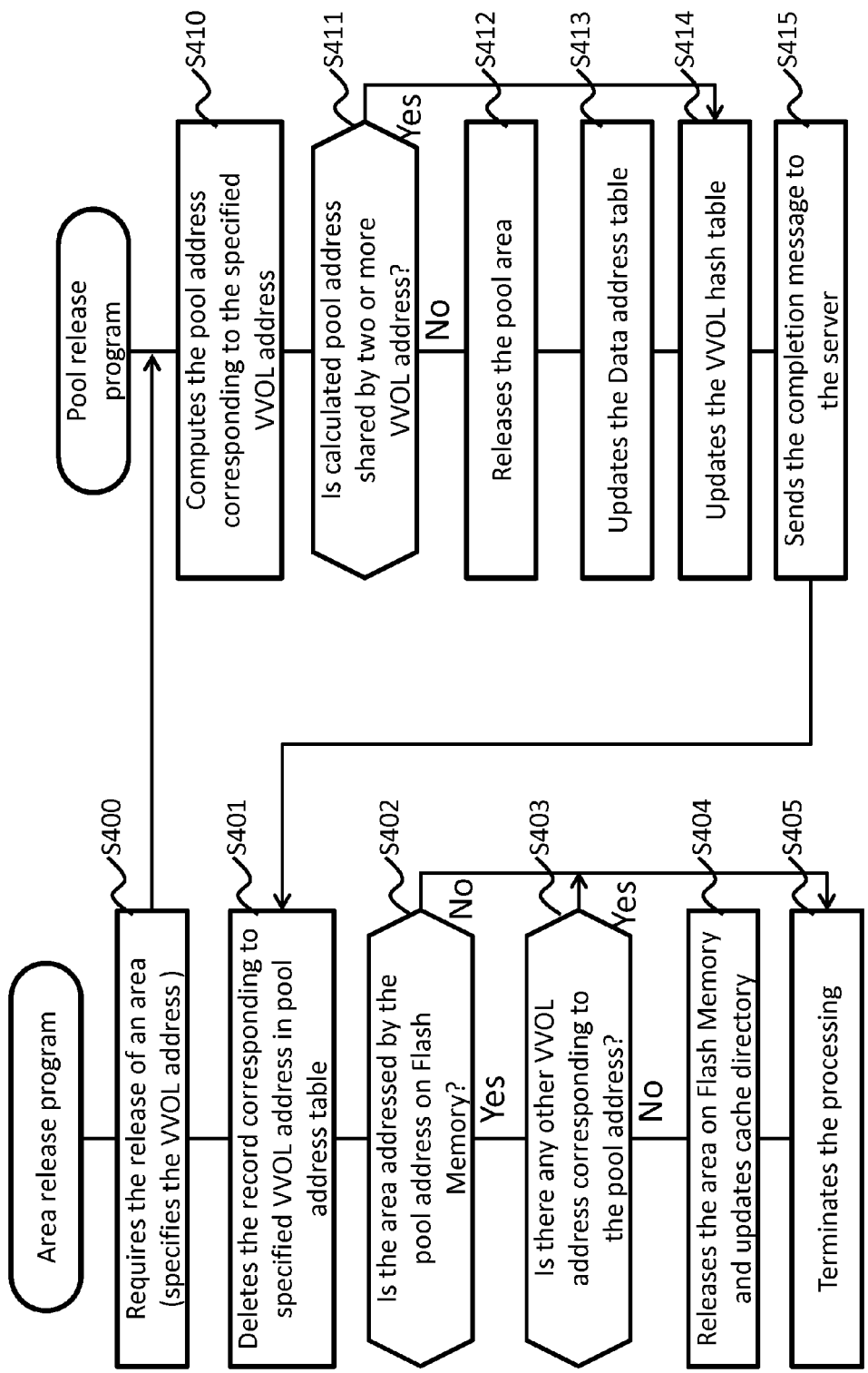
FIG. 15 is a flow diagram illustrating an example of a pool area release processing.

FIG. 15 is a flow diagram illustrating an example of a pool area release processing. Since the storage system 200 provides virtual volume to the server 100, the server 100 and the storage system support a pool area release processing. For example, the storage area that is determined to be unnecessary by an application is released. To realize this pool area release processing, the area release program is executed in the server 100 and the pool release program is executed in the storage system 200. The area release program requires the release of an area to the storage system 200 (S400). The address of the target area is sent to the storage system 200 as a parameter.

The storage system 200 which receives the request executes the pool release program. The pool release program calculates the pool address corresponding to the specified VVOL address (S410). Then the program confirms whether the calculated pool address is shared by two or more VVOL addresses (S411). This processing is realized by calculating the hash value from the data address table and checking whether there are two or more records with the hash value in the VVOL hash table. If the calculated pool address is not shared, the program releases the pool area (S412). The released area is managed by free queue, for instance. Then, the program deletes the record with the pool address (S413). In step S414, the program deletes the hash value corresponding to the specified VVOL address (S414). No data is stored in the specified address. Finally, the pool release program sends the completion message and the pool address to the server (S415).

The area release program which receives the report from the storage system 200 deletes the record with specified VVOL address from the pool address table (S401). Then, the program confirms whether there is an area addressed by the reported pool address on flash memory (S402). If the result of step S402 is "no," since there is no cached data in the flash memory, the program terminates the processing. If the result of step S402 is "yes," there is a cached data of released area of the pool. Thus, in steps S403 and S404, the program deletes the cached data. The program confirms whether there is any other VVOL address corresponding to the reported address (S403). If the result of step S403 is "no," since the area of the flash memory is not shared by other VVOL areas, the program releases the area on flash memory and updates the cache directory (S404).

With the methods mentioned above, if the data "A" is read from VVOL 210 in FIG. 7, the record with VVOL 220 is not created although the record with VVOL 210 is created in the pool address table. Thus, the first read for the data "A" of VVOL 220 accesses the storage system 200. It means that the result of step S101 of the server read program in FIG. 12 is "no" and the program issues a read command to the storage system 200 in step S102. The data which is read from the storage system 200 by the read command is not cached in the flash memory, because the same data is already stored in the flash memory. Although the flash memory is not consumed uselessly, a network 110 between the server 100 and the storage system 200 is consumed uselessly due to the read command for VVOL 220. By obtaining pool address information from the storage system 200 in advance, the first read for the data "A" of VVOL 220 is processed by the flash memory access. Useless network consumption is avoided.

FIG. 16 is a flow diagram illustrating an example of a processing to obtain the pool addresses. To realize this processing, the pool address obtainment program is executed in the server 100 and the pool address report program is executed in the storage system 200. The address obtainment program requires pool addresses of the VVOL (S500). The ID of the target VVOL is sent to the storage system 200 as a parameter. The storage system 200 which receives the request executes the pool address report program. The pool address report program calculates pool addresses by searching the VVOL hash table and the data address table by using specified VVOL 10 (S510). Then the program sends the calculated pool addresses to the server (S511). Finally, the pool address obtainment program updates the pool address table based on the obtained pool addresses (S501) and terminates the processing (S502).

Second Embodiment

In the first embodiment, the data reduction method with write through mode is described. The write through mode of write command synchronously write the data to the storage system 200. Thus, the response time of the command will be large. In the second embodiment, write back mode of the write processing is described. With the write back mode, the response time of the write command will be small. With the write back mode, the issue is that the value of the pool address of the server cache directory could not be decided. In this embodiment, the methods to cache the write data in the flash memory and to write the data asynchronously to the storage system 200 are described.

FIG. 17 is an example of the server cache directory in accordance with the second embodiment. With the write back mode, the pool address could not be decided. Thus, the write processing in this embodiment uses the VVOL address instead of the pool address (for caching as compared with the first embodiment in FIG. 11). "00-512" is a VVOL address and is not a pool address in fifth row. The data written to the address 512 of the VVOL 00 is stored in address 1024 in the flash memory. Since the pool has volume and "xx" of the "xx-yy" means volume ID, the record with the same pool address as the VVOL address does not exist in the table.

FIG. 18 is an example of the pool address table in accordance with the second embodiment. The new attribute is a write back column (as compared with the first embodiment in FIG. 10). The column is used in order to determine which data should be written in the storage system 200. If the value of the write back attribute is "on," the data of the specified VVOL address and VVOL ID is cached into the flash memory and is not yet written to the storage system 200. In the example of FIG. 18, the second row means that the write data in address 512 of the VVOL 00 is not yet written to the storage system 200. Thus, the data should be written asynchronously to the storage system 200.

Figure 19:
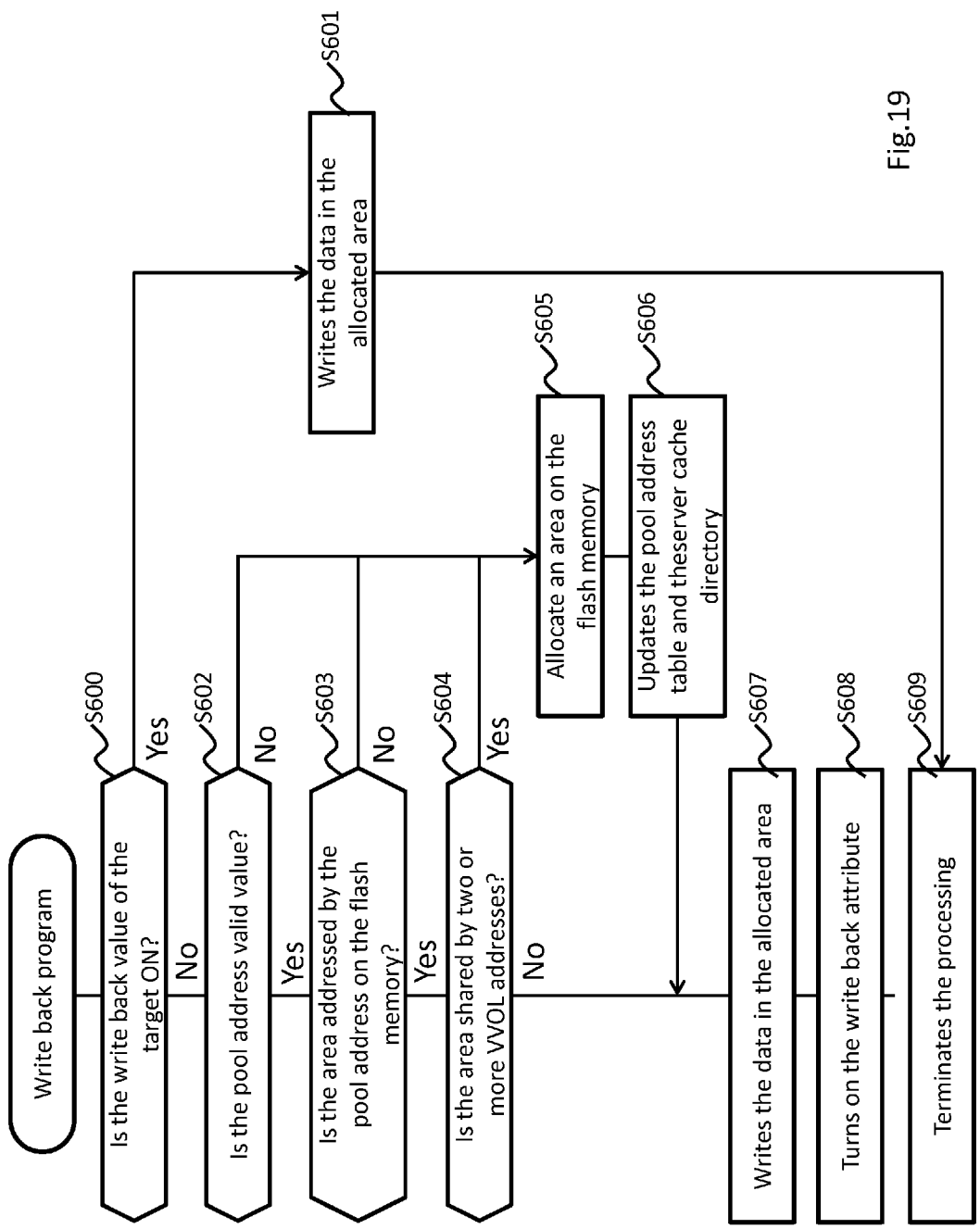
FIG. 19 is a flow diagram illustrating an example of the write processing with write back mode in the server in accordance with the second embodiment.

FIG. 19 is a flow diagram illustrating an example of the write processing with write back mode in the server 100 in accordance with the second embodiment. To realize the write processing, a write back program is executed in the server 100. First, the write back program confirms whether the write back value of the write target address is ON (S600). If the result of step S600 is "yes," the program writes the write data in the allocated area on the flash memory (S601). The value of the write back is turned off after writing to the storage system 200. Thus, the dirty data certainly exists on the flash memory when the value of the write back is "ON."

When the pool address is invalid, the data addressed by the area addressed by the pool address does not exist in the flash memory, or the area addressed by the pool address exists in the flash memory but the area is shared by two or more VVOL addresses, the program allocates a new area on the flash memory. To do so, the program confirms whether the pool address is a valid value (S602). If the result is "no," the program progresses to step S605 for allocating a new area on the flash memory. The "-" entry in the pool address table means invalid. If the result of step S602 is "yes," the program confirms whether the area addressed by the pool address is on the flash memory (S603). If the result is "no," the program progresses to step S605 for allocating a new area on the flash memory. This processing is realized by using the server cache directory. If the result of step S603 is "yes," the program confirms whether the area is shared by two or more VVOL addresses (S604). If the result is "yes," the program progresses to step S605 for allocating a new area on the flash memory. This processing is realized by using the pool address table. In step S605, the program allocates an area on the flash memory. The program updates the pool address table and the server cache directory (S606).

The VVOL ID and VVOL address are stored in the pool address field of the pool address table and the server cache directory. If the result of step S604 is "no," the data of write destination is already cached in the flash memory. Thus, the program writes the data in the area which is already allocated (S607) and turns on the write back attribute (S608). Finally, the program terminates the program (S609).

The process of the server read program illustrated in FIG. 12 does not need to be modified for this embodiment. First, the read program obtains the VVOL address stored in the pool address field of the pool address table. The program can obtain the flash memory address by searching the server cache directory by the obtained VVOL address.

Figure 20:
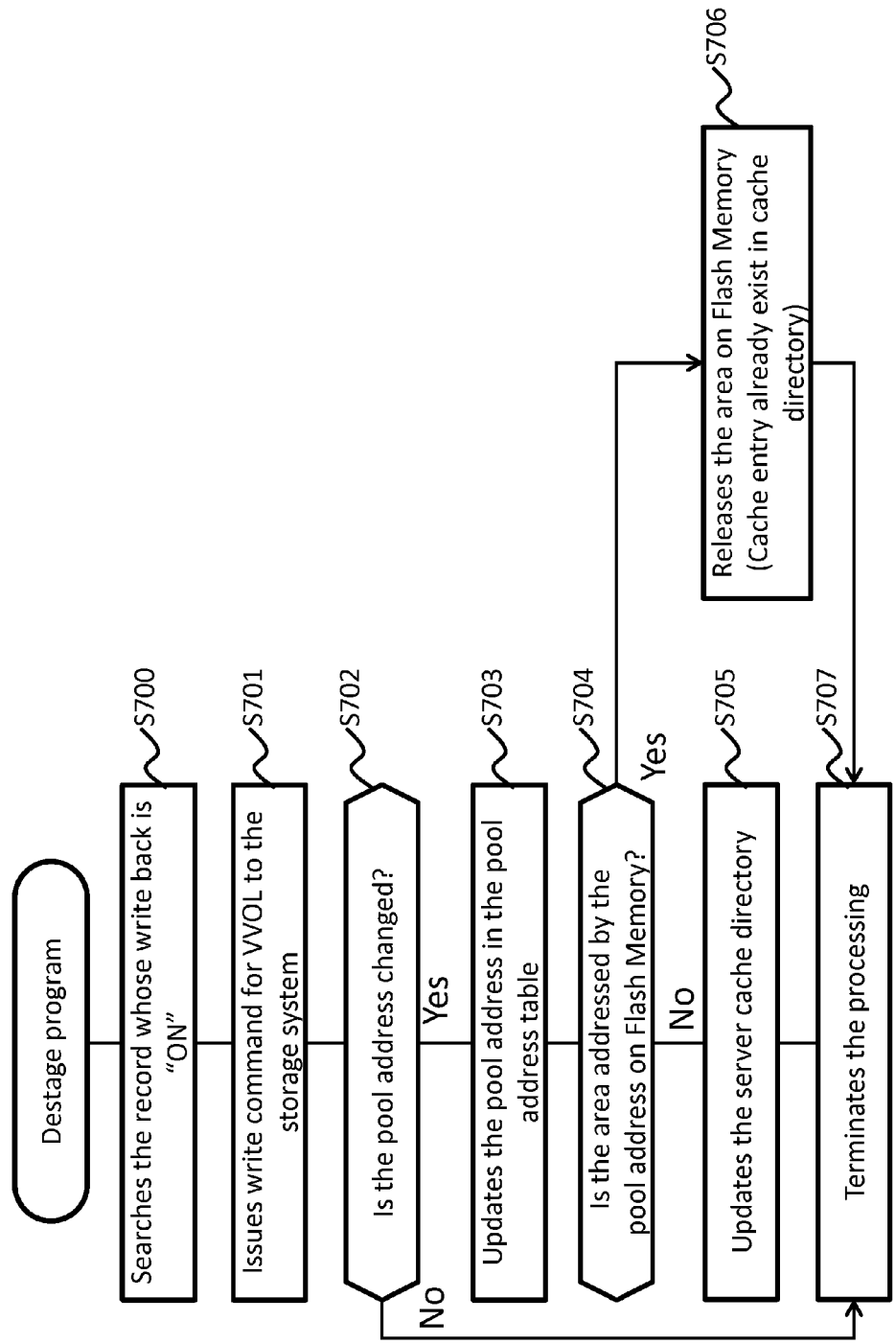
FIG. 20 is a flow diagram illustrating an example of the processing which writes the data on the flash memory to the storage system asynchronously.

FIG. 20 is a flow diagram illustrating an example of the processing which writes the data on the flash memory to the storage system 200 asynchronously. To realize the processing, a destage program is executed in the server 100. First, the destage program searches the record which has the "ON" in the write back field (S700). Then, the program issues a write command for VVOL to the storage system 200 (S701). The process of the storage write program illustrated in FIG. 13 (i.e., S210 to S215) is executed in the storage system 200. The destage program which receives the completion message and the pool address from the storage system 200 progresses to step S702. In step S702, the program confirms whether the pool address is changed (S702). If the result of step S702 is "no," the program terminates the processing (S707). This case is that the data is cached into the flash memory by using the pool address but not the VVOL address. Thus, the update of the control information is not needed in this case. This case progresses from step S604 to step S607 in FIG. 19. For example, if the server executes the write processing just after the read processing, this case will occur.

If the result of step S702 is "yes," the program updates the pool address in the pool address table (S703). The VVOL address stored in the pool address field in the pool address table is changed into the received pool address. Then, the program confirms whether the area addressed by the received pool address is on the flash memory (S704). If the result of step S704 is "yes," the program deletes the record with the old pool address from the server cache directory (S706). This case means that the received pool address is shared with another VVOL area in the storage system 200 and the data is cached into the flash memory by the access to another VVOL area. If the result of step S704 is "no," the program updates the server cache directory (S705). The VVOL address stored in the pool address field in the pool address table is changed into the received pool address. Finally, the program terminates the processing (S707).

Third Embodiment

In the first and second embodiments, the system configuration has one storage system and one or more servers. The sharing of one VVOL by two or more servers is not taken into consideration. In the third embodiment, the data reduction methods in multiple server configurations, external storage configuration, and data cache appliance configuration are described. The configuration in which one VVOL is shared by two or more servers is shown in FIG. 21.

Figure 21:
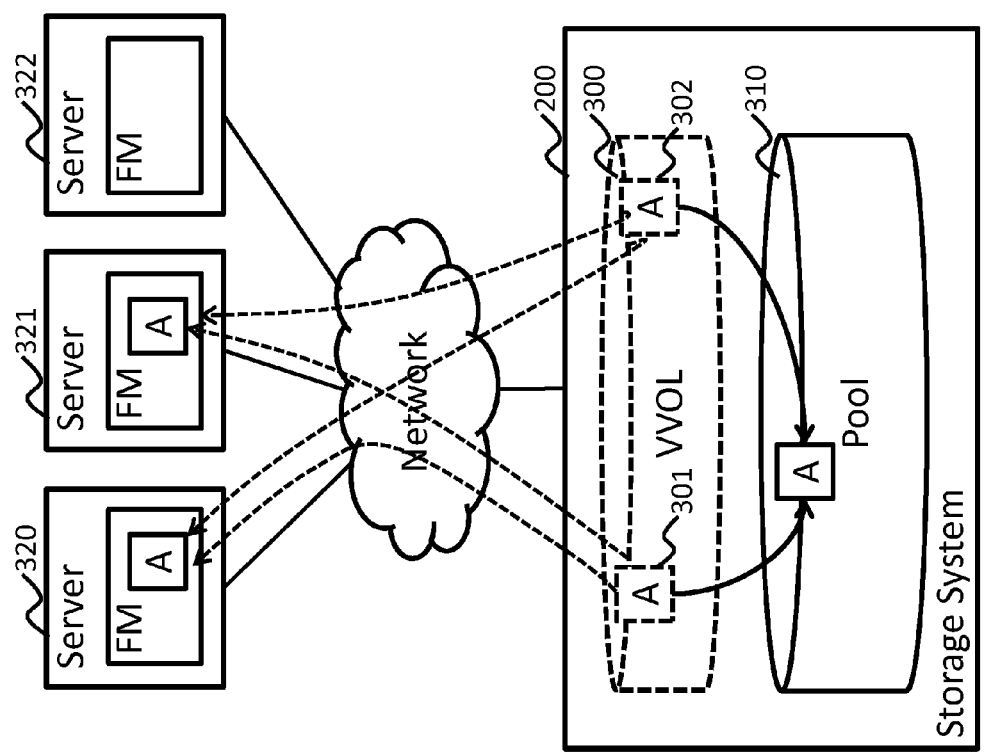
FIG. 21 is a conceptual diagram showing an example of VVOL sharing by multiple servers.

FIG. 21 is a conceptual diagram showing an example of VVOL sharing by multiple servers. The servers 320, 321, and 322 are connected to the storage system 200. The storage system has a VVOL 300 and a pool 310. The data "A" 301 and 302 is de-duplicated in the pool 310. The server 320 and 321 access the data "A" 301 and 302 and cache the data into the flash memory in each of the two respective servers. In the case where one server in the server 320 and server 321 accesses both of the data "A" 301 and the data "A" 302, only one data "A" is cached into the flash memory in the server. This is realized by the methods described above for the first and second embodiments. However, if two servers 320 and 321 access both of the data "A" 301 and 302, the consistency of the cache data between the server 320 and 321 has to be assured. The processing to assure the consistency is shown in FIG. 22.

Figure 22:
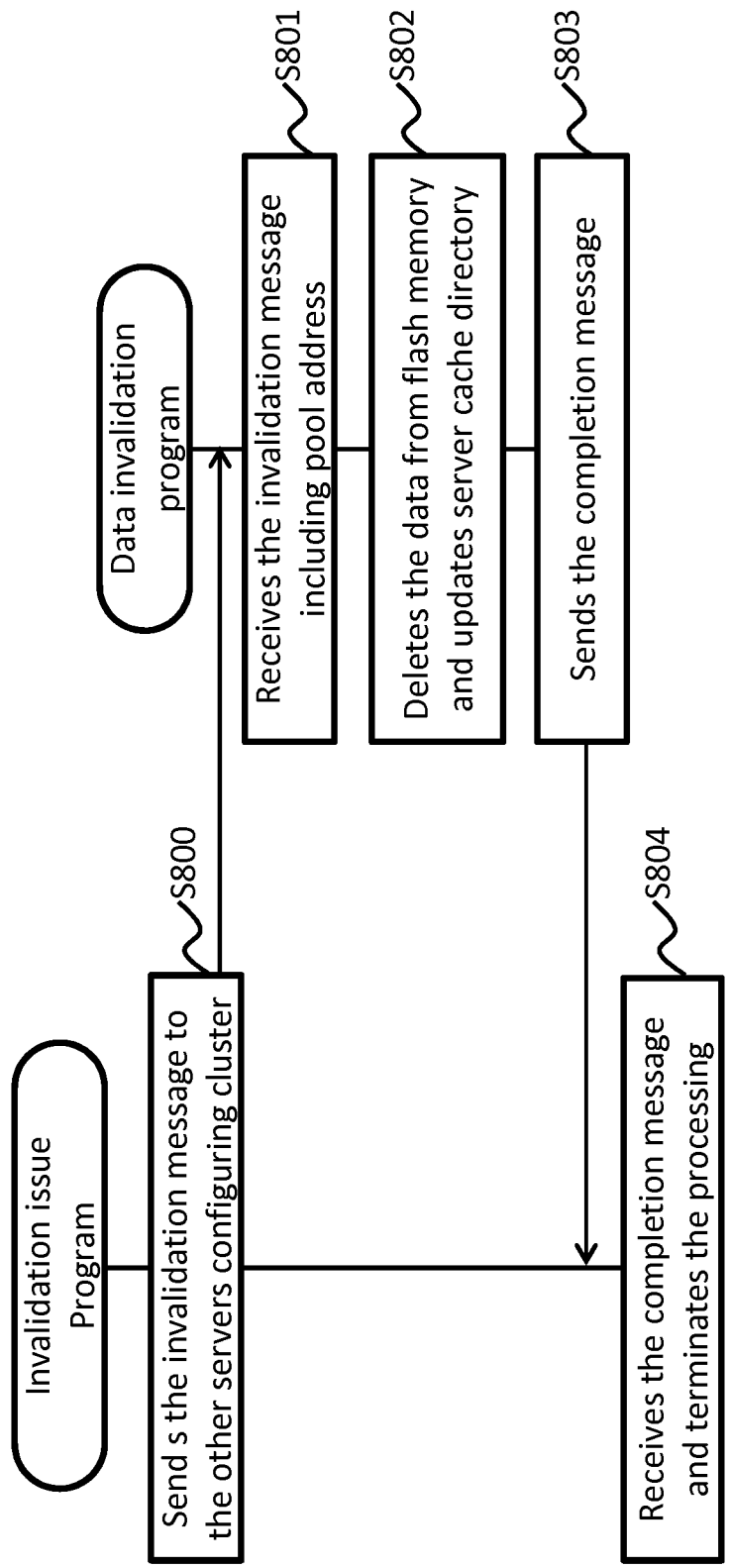
FIG. 22 is a flow diagram illustrating an example of the data invalidation processing.

FIG. 22 is a flow diagram illustrating an example of the data invalidation processing. To assure the consistency, the server which updates the cached data executes the invalidation issue program. The other servers which receive the invalidation message execute a data invalidation program. The invalidation issue program is called from just before termination of the server write program.

First, the invalidation issue program sends the invalidation message to the other servers configuring a cluster. It means the servers which share the same VVOL (S800). The pool address is also sent as a parameter. The data invalidation program receives the invalidation message and the pool address (S801). The program deletes the data from the flash memory and deletes the record with the notified pool address (S802). Then, the program sends the completion message to the caller (S803). Finally, the invalidation issue program receives the completion message and terminates the processing (S804).

Figure 23:
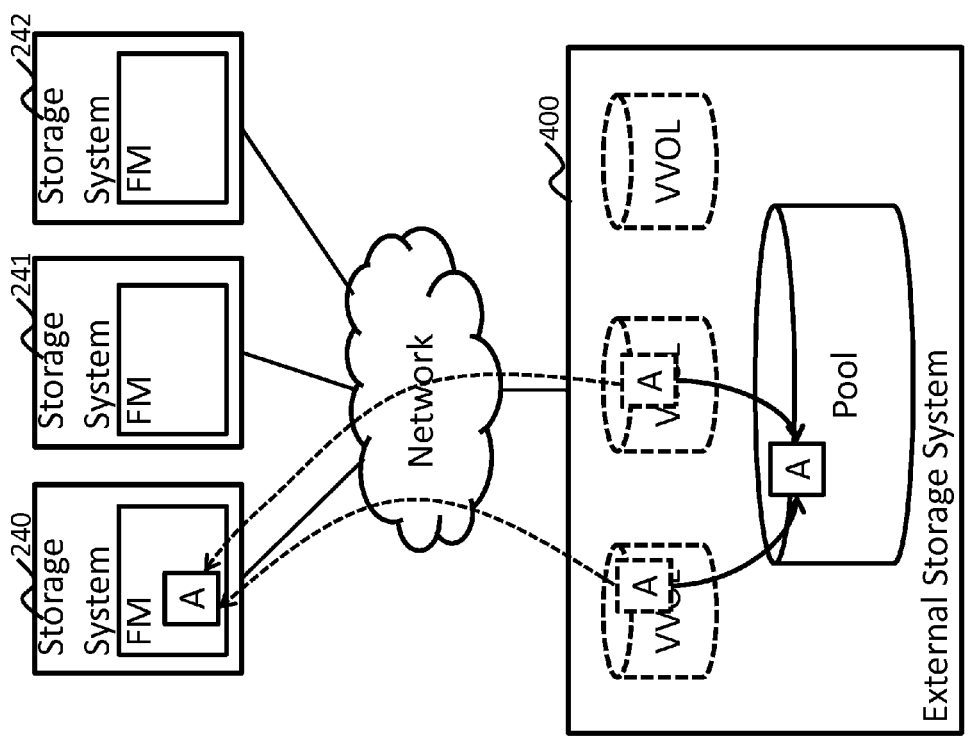
FIG. 23 shows an example of a configuration including an external storage system which has data reduction functionality and one or more storage systems which are connected to the external storage system and which do not have the data reduction functionality.

Some storage systems have external storage functionality. In an example of FIG. 23, the system has an external storage system 400 which has data reduction functionality and one or more storage systems 240, 241, and 242 connected to the external storage system 400. The storage system 240, 241, and 242 each have external storage functionality and storage area to cache the data of the external storage system 400 but do not have the data reduction functionality. The storage systems 240, 241 and 242 correspond to the servers in the configuration mentioned above. The external storage system 400 corresponds to the storage system 200 in the configuration mentioned above. In this configuration, the technologies mentioned above could be applied simply.

Figure 24:
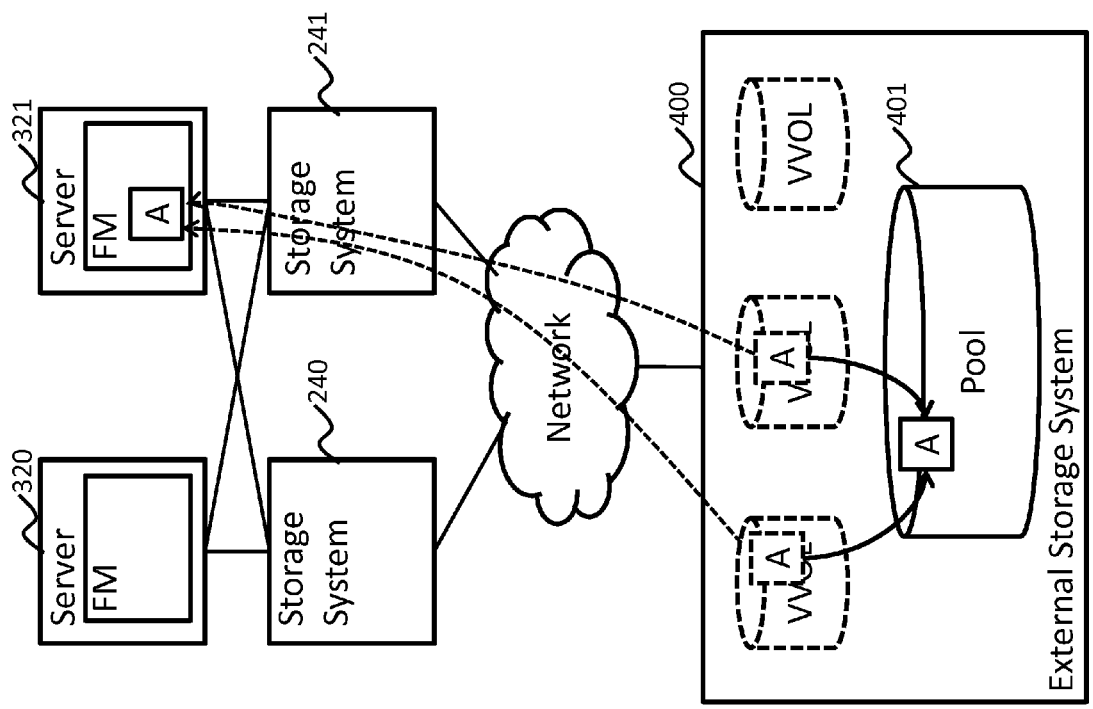
FIG. 24 shows an example of a configuration in which the external storage system has the data reduction functionality and the servers each have a storage area to cache the data stored in the external storage system.

FIG. 24 shows an example of a configuration in which the external storage system 400 has the data reduction functionality and the servers each have a storage area to cache the data stored in the external storage system. The servers 320 and 321 and external storage system 400 are connected to the storage system 240 and 241. The external storage system 400 provides a volume to the storage system and the storage system provides the volume to the servers. To reduce the data on the flash memory in the server, the external storage system 400 provides notification of the pool address of the pool 401 with the completion message for the access from the storage system 240 and 241.

The storage systems 240 and 241 manage correspondence relation between the VVOL address and the pool address of the external storage system 400. When the storage system 240, 241 receives the access from the server 320, 321, the storage system 240, 241 calculates the pool address of the external storage system 400. The storage system sends the pool address with the completion message. The server 320, 321 caches the data by using the pool address of the external storage system 400. As for the data stored in the same address in the external storage system 400, only one data is stored in the flash memory.

Figure 25:
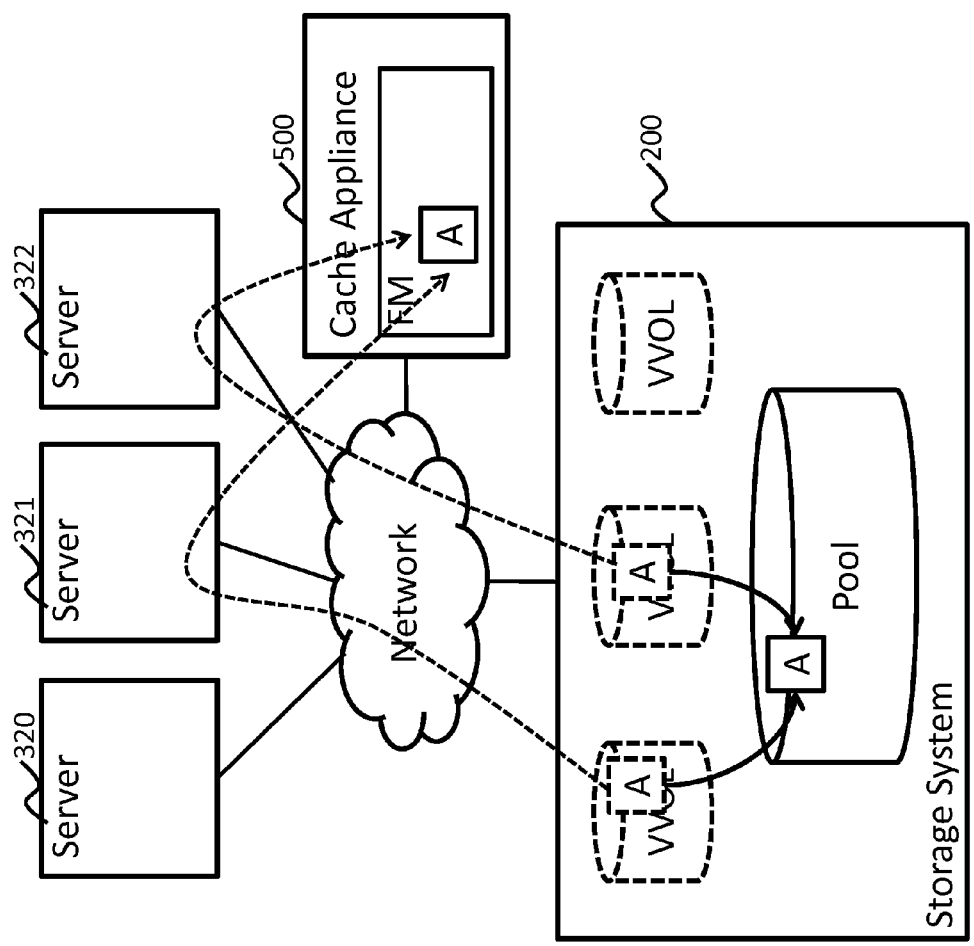
FIG. 25 shows an example of a configuration including a cache appliance which has the flash memory.

FIG. 25 shows an example of a configuration including a cache appliance 500 which has the flash memory. The technologies mentioned above could be applied to this configuration. The storage system 200 provides notification of the pool address of the pool to the servers 320, 321, and 322. The servers 320, 321, and 322 manage the correspondence relation between the VVOL address and the notified pool address. The servers 320, 321, and 322 store the flash memory address of the cache appliance 500 in the flash memory address field of the server cache directory.

Figure 26:
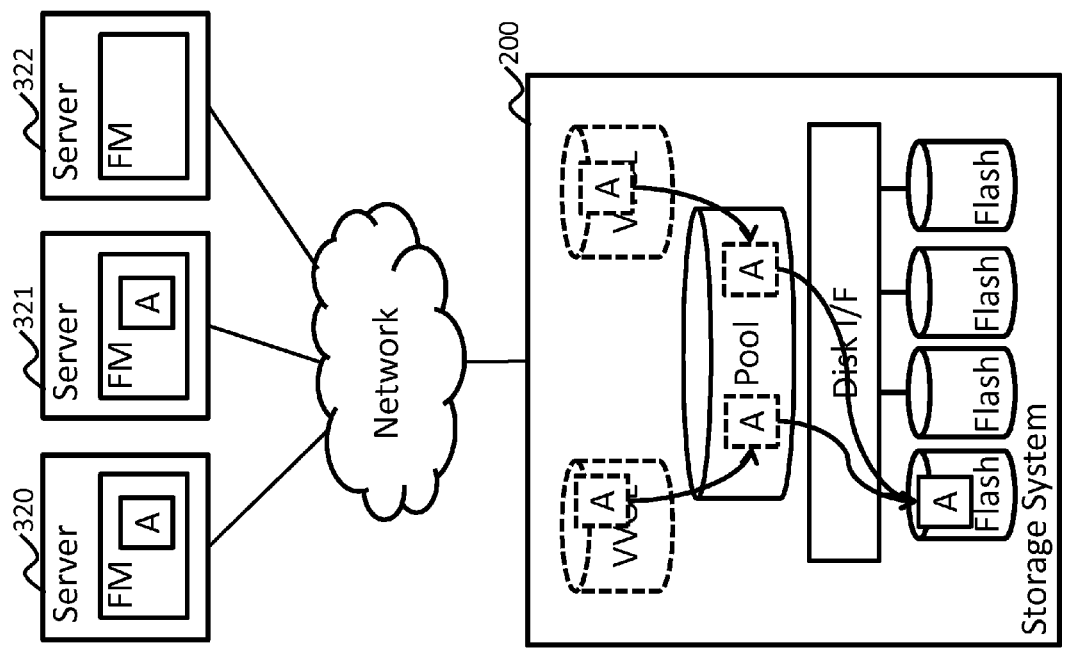
FIG. 26 shows an example of a configuration in which the storage media has the data reduction functionality and the servers each have a storage area to cache the data stored in the storage media.

FIG. 26 shows an example of a configuration in which the storage device has the data reduction functionality and the servers each have a storage area to cache the data stored in the storage system which has the storage media. The storage device has a controller and a table to manage a relationship between disk address provided to the storage system and physical address of the storage device. To apply this invention for this example, the storage device notifies the physical address of the storage device with the completion message for the I/O command from the storage system to the storage device. Also, the storage system notifies the physical address of the storage device with the completion message for I/O command from the server to the storage system. Furthermore, the server caches the data on the flash memory in the server by using notified physical address of the storage media. A flash memory package or the like can be considered as a storage device.

Of course, the system configurations illustrated in FIGS. 1, 7, 21, and 23-26 are purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for data reduction in storage system. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A computer coupled to a storage system which includes a plurality of virtual volumes, the computer comprising:
   a memory; and
   a controller operable to manage information stored in the memory, which corresponds to a plurality of addresses, of the plurality of virtual volumes provided from the storage system to the computer and including at least one set of multiple storage areas sharing same data to be stored in the storage system,
   wherein the controller is operable to manage storing of the shared same data in the memory of the computer by using the information of the at least one set of multiple storage areas,
   wherein the information of the at least one set of multiple storage areas comprises information relating to virtual volume identifiers (IDs) of the plurality of virtual volumes, virtual volume addresses of the plurality of virtual volumes, pool addresses in a pool of physical storage areas in the storage system which correspond to the virtual volume IDs and the virtual volume addresses, and memory addresses in the memory of the computer which correspond to the pool addresses indicating storing of data of the pool addresses in the memory of the computer,
   wherein the controller sends an I/O command to the storage system specifying a virtual volume ID of the virtual volume IDs and a virtual volume address of the virtual volume addresses to access the shared same data, and
   wherein the controller receives the information relating to the pool addresses from the storage system and stores the pool addresses in the memory.

2. The computer according to claim 1,
   wherein the controller is operable to use the information relating to any pool address of the pool addresses to determine whether data of the pool address is already stored in the memory of the computer, and if the data of the pool address is not already stored in the memory, then allocate an area in the memory to store the data of the pool address.

3. The computer according to claim 1,
   wherein the controller is operable to update the information as a result of any of an update of the virtual volume IDs and the virtual volume addresses, an update of the pool addresses which correspond to the virtual volume IDs and the virtual volume addresses, or an update of the memory addresses which correspond to the pool addresses.

4. The computer according to claim 1, wherein, for reading data from a read target region of the storage system if the data in the read target region is not already stored in the memory of the computer, the controller is operable to:
   receive data from the storage system and a first pool address in the pool of physical storage areas in the storage system which corresponds to a first virtual volume identifier (ID) and a first virtual volume address of the target region;
   allocate an area in the memory and store the received data in the allocated area in the memory; and
   update the information to reflect any changes to a correspondence between the first virtual volume ID and the first virtual volume address and the first pool address, and any changes to a correspondence between a first memory address of the allocated area in the memory and the first pool address.

5. The computer according to claim 1, wherein, for writing write data to a write destination region of the storage system, the controller is operable to:
   receive a completion message of writing the write data to the write destination region of the storage system and a first pool address in the pool of physical storage areas in the storage system which corresponds to a first virtual volume identifier (ID) and a first virtual volume address of the write destination region;
   determine whether the received first pool address corresponding to the first virtual volume ID and the first virtual volume address of the write destination region is registered in a pool address table and whether the received first pool address corresponding to the first virtual volume ID and the first virtual volume address of the write destination region has changed in the pool address table, the pool address table showing a correspondence between the first pool address and the first virtual volume ID and the first virtual volume address;
   if the received first pool address is registered in the pool address table and if the received first pool address corresponding to the first virtual volume ID and the first virtual volume address of the write destination region has not changed in the pool address table, then determine whether the memory has an area allocated for the received first pool address and, if yes, then store the write data in the memory and, if no, then allocate an area in the memory, update information on a correspondence between the received first pool address and a memory address of the allocated area in the memory, and store the write data to the allocated area in the memory; and
   if the received first pool address is not registered in the pool address table or if the received first pool address corresponding to the first virtual volume ID and the first virtual volume address of the write destination region has changed in the pool address table, then update the pool address table to register the first received pool address corresponding to the first virtual volume ID and the first virtual volume address of the write destination region, allocate an area in the memory, update information on a correspondence between the received first pool address and a memory address of the allocated area in the memory, and store the write data to the allocated area in the memory.

6. The computer according to claim 1, wherein, for releasing an area in the memory corresponding to a first virtual volume identifier (ID) and a first virtual volume address, the controller is operable to:
  delete a record of the first virtual volume ID and the first virtual volume address and a corresponding first pool address in a pool address table showing a correspondence between the first pool address and the first virtual volume ID and the first virtual volume address; and
  if the first pool address has a corresponding memory address indicating storing of data of the first pool address in an area of the memory at the memory address and if there is no other virtual volume ID and virtual volume address corresponding to the first pool address, then release the area of the memory at the memory address and update information on a correspondence between the first pool address and the memory address to reflect release of the area at the memory address.

7. The computer according to claim 1, wherein, for writing, in write back mode, write data to a write destination region having a write target address which is a first virtual volume identifier (ID) and a first virtual volume address in the storage system, the controller is operable to:
  if a write back value of the write target address to write data in the storage system is ON indicating the write data is cached in an allocated area in the memory but has not yet been written to the storage system, writing the write data in the allocated area in the memory of the computer;
  if the write back value of the write target address to write data in the storage system is not ON, and if there is no memory address in the memory corresponding to a first pool address which corresponds to the write target address or if the pool address corresponds to multiple virtual volume addresses in the storage system, then allocate an area in the memory, update information on a correspondence between the first pool address and the write target address, update information on a correspondence between the valid first pool address and a memory address of the allocated area in the memory, and store the write data to the allocated area in the memory;
  if the write back value of the write target address to write data in the storage system is not ON, and if there is a memory address in the memory corresponding to the first pool address which corresponds to the write target address, and if the first pool address does not correspond to multiple virtual volume addresses in the storage system, then store the write data to the allocated area in the memory; and
  write the write data in the memory to the write target address in the storage system asynchronously.

8. The computer according to claim 1,
  wherein the computer is a first computer that shares a virtual volume of the storage system with a second computer and stores data in the shared virtual volume to a memory address in the memory of the first computer which is a first memory, the data also to be stored in a second memory of the second computer, and
  wherein if the data in the shared virtual volume is updated in the memory of the second computer, the second computer sends an invalidation message to the first computer, and the controller of the first computer is operable to delete the data from the memory address in the first memory and delete a correspondence between the memory address and a first virtual volume ID (identifier) and a first virtual volume address of the shared virtual volume.

9. A storage system having a plurality of volumes in a system which includes the storage system and a computer coupled to the storage system that stores in a memory data to be stored in the storage system, including data which is same data shared by at least one set of multiple storage areas in the storage system, the storage system comprising:
  a storage device to provide a plurality of volumes to a computer for storing data, the plurality of volumes including the at least one set of multiple storage areas sharing the same data to be stored in the storage device; and
  a storage controller operable to receive an I/O (Input/Output) command from the computer specifying a virtual volume identifier (ID) and an address of a volume of the plurality of volumes in the storage device, calculate a pool address in a pool of physical storage areas in the storage device which corresponds to the specified virtual volume ID and the specified address of the volume, and send the pool address corresponding to the specified virtual volume ID and the specified address of the volume to the computer.

10. The storage system according to claim 9, wherein the I/O command is a write command to write write data to a write destination region having the specified virtual volume ID and the specified address of the volume, and wherein the storage controller is operable to:
  if no pool area is allocated to the specified virtual volume ID and specified address of the volume or if the calculated pool address is shared by the at least one set of multiple storage areas, calculate a hash value for the write data, determine if there is any same data stored in the storage system having the hash value, update the pool address of the write data to a pool address of the same data having the hash value if the same data having the hash value is already stored in the storage system, allocate an area in the pool having an allocated pool address in the pool and update the pool address of the write data to the allocated pool address if there is no same data stored in the storage system, and send to the computer the updated pool address corresponding to the specified virtual volume ID and the specified address of the volume; and
  if a pool area is allocated to the specified virtual volume ID and specified address of the volume and if the calculated pool address is not shared by multiple volume addresses, store the write data to the calculated pool address, and send to the computer the calculated pool address corresponding to the specified virtual volume ID and the specified address of the volume.

11. The storage system according to claim 9, wherein, upon receiving an area release command for releasing an area in the memory corresponding to a virtual volume ID and an address of the volume in the storage device, the controller is operable to:
  calculate a pool address corresponding to the virtual volume ID and address of the volume corresponding to the area in the memory to be released;
  if the calculated pool address corresponds to multiple volume addresses, then delete a correspondence between a hash value of data in the virtual volume ID and the address of the volume and the virtual volume ID and the address of the volume which corresponds to the area in the memory to be released; and if the calculated pool address does not correspond to multiple volume addresses, then release a pool area corresponding to the calculated pool address, delete a correspondence between a hash value of data in the calculated pool address and the calculated pool address, and delete the correspondence between the hash value of data in the virtual volume ID and the address of the volume and the virtual volume ID and the address of the volume which corresponds to the area in the memory to be released.

12. The storage system according to claim 9, wherein the I/O command is a read command to read data from a read target region having the specified virtual volume ID and the specified address of the volume, and wherein, upon receiving from the computer a pool address obtainment command for obtaining a pool address corresponding to the specified virtual volume ID and the specified address of the volume in the storage device prior to reading the data, the storage controller is operable to:
calculate a pool address of the specified virtual volume ID and the specified address of the volume based on a correspondence between the specified virtual volume ID and the specified address of the volume and a hash value of data in the specified virtual volume ID and the specified address of the volume and a correspondence between the hash value and the pool address; and
send the calculated pool address to the computer.

13. A system comprising:
a storage system having a storage device to provide a plurality of volumes for storing data, and a storage controller;
a computer coupled to the storage system and having a memory, and a controller operable to manage information stored in the memory, which corresponds to a plurality of addresses, of the plurality of volumes provided from the storage system to the computer and including at least one set of multiple storage areas sharing same data to be stored in the storage system,
wherein the controller is operable to manage storing of the shared same data in the memory of the computer by using the information of the at least one set of multiple storage areas, and
wherein the information of the at least one set of multiple storage areas comprises information relating to virtual volume identifiers (IDs) and addresses of the plurality of volumes, pool addresses in a pool of physical storage areas in the storage system which correspond to the virtual volume IDs and addresses of the plurality of volumes, and memory addresses in the memory of the computer which correspond to the pool addresses indicating where data of the pool addresses are stored in the memory, and
wherein the controller receives the information relating to the pool addresses from the storage system and stores the pool addresses in the memory.

14. The system according to claim 13,
wherein the storage controller is operable to receive an Input/Output (I/O) command from the computer specifying a first virtual volume ID and a first address of a volume in the storage device, calculate a first pool address in a pool of physical storage areas in the storage device which corresponds to the first virtual volume ID and the first address of the volume, and send the first pool address corresponding to the first virtual volume ID and the first address of the volume to the computer, and wherein the controller is operable to determine whether data of the first pool address is already stored in the memory of the computer, and if the data of the first pool address is not already stored in the memory, then allocate an area in the memory to store the data of the first pool address.

15. The system according to claim 13, wherein the storage controller is operable to:
receive a write command from the computer to write write data to a write destination region having a first virtual volume identifier (ID) and a first address of the volume;
if no pool area is allocated to the first virtual volume ID and the first address of the volume or if a calculated first pool address is shared by the at least one set of multiple storage areas, calculate a hash value for the write data, determine if there is any same data stored in the storage system having the hash value, update the first pool address of the write data to a second pool address of the same data having the hash value if the same data having the hash value is already stored in the storage system; and
if a pool area is allocated to the first virtual volume ID and the first address of the volume and if the calculated first pool address is not shared by multiple virtual volume addresses, store the write data to the calculated first pool address, and send to the computer the calculated first pool address corresponding to the first virtual volume ID and the first address of the volume.

16. The system according to claim 15, wherein the controller is operable to:
receive a completion message of writing the write data to the write destination region of the storage system and the first pool address from the storage system;
determine whether the received first pool address corresponding to the first virtual volume ID and the first address of the volume is registered in a pool address table and whether the received first pool address corresponding to the first virtual volume ID and the first address of the volume has changed in the pool address table, the pool address table showing a correspondence between the first pool address and the first virtual volume ID and the first address of the volume;
if the received first pool address is registered in the pool address table and if the received first pool address corresponding to the first virtual volume ID and the first address of the volume has not changed in the pool address table, then determine whether the memory has an area allocated for the received first pool address and, if yes, then store the write data in the memory and, if no, then allocate an area in the memory, update information on a correspondence between the received first pool address and a memory address of the allocated area in the memory, and store the write data to the allocated area in the memory; and
if the received first pool address is not registered in the pool address table or if the received first pool address corresponding to the first virtual volume ID and the first address of the volume has changed in the pool address table, then update the pool address table to register the received first pool address corresponding to the first virtual volume ID and the first address of the volume, allocate an area in the memory, update information on a correspondence between the received first pool address and a memory address of the allocated area in the memory, and store the write data to the allocated area in the memory.

17. The system according to claim 13, wherein, upon receiving from the computer an area release command for releasing an area in the memory corresponding to a first virtual volume identifier (ID) and the first address of the volume in the storage device, the controller is operable to:
 calculate a first pool address corresponding to the first virtual volume ID and the first address of the volume corresponding to the area in the memory to be released;
 if the calculated first pool address corresponds to multiple virtual volume addresses, then delete a correspondence between a hash value of data in the first virtual volume ID and the first address of the volume and the first virtual volume ID and the first address of the volume which corresponds to the area in the memory to be released; and
 if the calculated first pool address does not correspond to multiple virtual volume addresses, then release a pool area corresponding to the calculated first pool address, delete a correspondence between a hash value of data in the calculated first pool address and the calculated first pool address, and delete the correspondence between a hash value of data in the first virtual volume ID and the first address of the volume and the first virtual volume ID and the first address of the volume which corresponds to the area in the memory to be released.

18. The system according to claim 17, wherein the controller is operable to:
 receive the calculated first pool address from the storage system;
 delete a record of the first virtual volume ID and the first address of the volume and a corresponding first pool address in a pool address table showing a correspondence between the first pool address and the first virtual volume ID and the first address of the volume; and
 if the first pool address has a corresponding memory address indicating storing of data of the first pool address in an area of the memory at the memory address and if there is no other virtual volume ID and address of the volume corresponding to the first pool address, then release the area of the memory at the memory address and update information on a correspondence between the first pool address and the memory address to reflect release of the area at the memory address.

19. A storage system having a plurality of storage areas and which is connected to a computer, the storage system comprising:
 a storage device which includes at least one set of multiple storage areas sharing same data to be stored in the storage device; and
 a storage controller operable to receive a command from the computer specifying one storage area of the at least one set of multiple storage areas, calculate an ID regarding the data shared by the one storage area, and send the ID to the computer,
 wherein the storage controller is operable to receive an Input/Output (I/O) command from the computer specifying a virtual volume identifier (ID) and an address of a volume in the storage device corresponding to the one storage area, calculate a pool address in a pool of physical storage areas in the storage device which corresponds to the specified virtual volume ID and the specified address of the volume, and send the pool address corresponding to the specified virtual volume ID and the specified address of the volume to the computer as the ID regarding the data shared by the one storage area.

20. The storage system according to claim 19,
 wherein the storage device provides a plurality of volumes to the computer for storing data, the plurality of volumes including the at least one set of multiple storage areas sharing same data to be stored in the storage device.

21. The storage system according to claim 19, wherein the I/O command is a write command to write write data to a write destination region having the specified virtual volume ID and the specified address of the volume, and wherein the storage controller is operable to:
 if no pool area is allocated to the specified virtual volume ID and specified address of the volume or if the calculated pool address is shared by the at least one set of multiple storage areas, calculate a hash value for the write data, determine if there is any same data stored in the storage system having the hash value, update the pool address of the write data to a pool address of the same data having the hash value if the same data having the hash value is already stored in the storage system, allocate an area in the pool having an allocated pool address in the pool and update the pool address of the write data to the allocated pool address if there is no same data stored in the storage system, and send to the computer the updated pool address corresponding to the specified virtual volume ID and the specified address of the volume; and
 if a pool area is allocated to the specified virtual volume ID and specified address of the volume and if the calculated pool address is not shared by multiple virtual volume addresses, store the write data to the calculated pool address, and send to the computer the calculated pool address corresponding to the specified virtual volume ID and the specified address of the volume.

22. The storage system according to claim 19, wherein, upon receiving an area release command for releasing an area in the memory corresponding to a virtual volume ID and an address of a volume in the storage device, the controller is operable to:
 calculate a pool address corresponding to the virtual volume ID and an address corresponding to the area in the memory to be released;
 if the calculated pool address corresponds to multiple virtual volume addresses, then delete a correspondence between a hash value of data in the virtual volume ID and the address and the virtual volume ID and the address which corresponds to the area in the memory to be released; and
 if the calculated pool address does not correspond to multiple virtual volume addresses, then release a pool area corresponding to the calculated pool address, delete a correspondence between a hash value of data in the calculated pool address and the calculated pool address, and delete the correspondence between a hash value of data in the virtual volume ID and the address of the volume and the virtual volume ID and the address which corresponds to the area in the memory to be released.

23. The storage system according to claim 19, wherein the I/O command is a read command to read data from a read target region having the specified virtual volume ID and the specified address of the volume, and wherein, upon receiving from the computer a pool address obtainment command for obtaining a pool address corresponding to the specified virtual volume ID and the specified address of the volume in the storage device prior to reading the data, the storage controller is operable to:
    calculate a pool address of the specified virtual volume ID and the specified address of the volume based on a correspondence between the specified virtual volume ID and the specified address of the volume and a hash value of data in the specified virtual volume ID and the specified address of the volume and a correspondence between the hash value and the pool address; and
    send the calculated pool address to the computer.

* * * * *